US012647584B2

(12) United States Patent
Meardi et al.

(10) Patent No.: US 12,647,584 B2
(45) Date of Patent: Jun. 2, 2026

(54) DISTRIBUTED ANALYSIS OF A MULTI-LAYER SIGNAL ENCODING

(71) Applicant: V-NOVA INTERNATIONAL LIMITED, London (GB)

(72) Inventors: Guido Meardi, London (GB); Laurence Charles Venner, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 470 days.

(21) Appl. No.: 18/249,043

(22) PCT Filed: Oct. 15, 2021

(86) PCT No.: PCT/GB2021/052685
§ 371 (c)(1),
(2) Date: Apr. 13, 2023

(87) PCT Pub. No.: WO2022/079450
PCT Pub. Date: Apr. 21, 2022

(65) Prior Publication Data
US 2023/0370624 A1      Nov. 16, 2023

(30) Foreign Application Priority Data

Oct. 16, 2020      (GB) ..................................... 2016457

(51) Int. Cl.
*H04N 19/33* (2014.01)
*G06V 10/94* (2022.01)
(Continued)

(52) U.S. Cl.
CPC .............. *H04N 19/33* (2014.11); *G06V 10/95* (2022.01); *G06V 20/44* (2022.01); *H04N 7/181* (2013.01)

(58) Field of Classification Search
CPC ...... H04N 19/33; H04N 7/181; H04N 17/004; H04N 19/132; H04N 19/164;
(Continued)

(56) References Cited

U.S. PATENT DOCUMENTS

| | | | | |
|---|---|---|---|---|
| 6,314,452 | B1 * | 11/2001 | Dekel | ..................... H04N 19/36 |
| | | | | 375/E7.064 |
| 7,639,882 | B2 * | 12/2009 | Itakura | ................. H04N 21/236 |
| | | | | 725/100 |

(Continued)

FOREIGN PATENT DOCUMENTS

| | | | | |
|---|---|---|---|---|
| CN | 101015191 | A | * 8/2007 | |
| CN | 110533000 | A | * 12/2019 | ........... G06V 40/162 |

(Continued)

OTHER PUBLICATIONS

Shi (NPL: "Real-time single image and video super-resolution using an efficient sub-pixel convolutional neural network," arXiv 2016) (Year: 2016).*

(Continued)

*Primary Examiner* — Shadan E Haghani
(74) *Attorney, Agent, or Firm* — Workman Nydegger

(57)      ABSTRACT

The present disclosure relates to a method of analysing a plurality of video camera feeds, the method comprising: encoding, at a first location, the plurality of video camera feeds using a layer-based encoding, including generating encoded data streams for each of a plurality of layers within the layer-based encoding, wherein different layers in the plurality of layers correspond to different spatial resolutions, higher layers representing higher spatial resolutions; transmitting, to a second location remote from the first location, encoded data streams for one or more lowest layers for the plurality of video camera feeds; decoding, at the second location, the encoded data streams to generate a set of reconstructions of the plurality of video camera feeds at a (Continued)

first spatial resolution; applying one or more video analysis functions to the set of reconstructions to identify one or more video camera feeds for further analysis; sending, to the first location for the identified one or more video camera feeds for further analysis, a request for further encoded data streams for one or more layers above the one or more lowest layers; responsive to the request, transmitting, to the second location, the further encoded data streams for one or more layers above the one or more lowest layers; decoding, at the second location, the further encoded data streams to generate a set of reconstructions for the identified one or more video camera feeds at a second spatial resolution; and applying one or more video analysis functions to the set of reconstructions at the second spatial resolution.

19 Claims, 15 Drawing Sheets

(51) Int. Cl.
*G06V 20/40* (2022.01)
*H04N 7/18* (2006.01)
(58) Field of Classification Search
CPC .... H04N 19/167; H04N 19/174; H04N 19/30; G06V 10/95; G06V 20/44; G06V 10/25; G06V 10/82; G06V 10/96; G06V 20/42; G06N 3/045; G06T 7/00; G06T 7/246; G06T 2207/20016; G06T 2207/20081; G06T 2207/20084

See application file for complete search history.

(56) References Cited

U.S. PATENT DOCUMENTS

| | | | | |
|---|---|---|---|---|
| 2014/0192887 | A1* | 7/2014 | Hong | H04N 19/30 |
| | | | | 375/240.12 |
| 2015/0297949 | A1* | 10/2015 | Aman | G06T 7/246 |
| | | | | 348/157 |
| 2015/0373341 | A1 | 12/2015 | Davies | |
| 2019/0171884 | A1* | 6/2019 | Bagheri | G06Q 30/0241 |

FOREIGN PATENT DOCUMENTS

| | | |
|---|---|---|
| EP | 3158735 | 4/2017 |
| EP | 3633990 | 4/2020 |

OTHER PUBLICATIONS

International Search Report & Written Opinion for application No. PCT/GB2021/052685 mailed on Jan. 10, 2022.
Office Action received for Japanese Patent Application No. 2023-522481, mailed on Sep. 30, 2025, 16 pages (8 pages of English Translation and 8 pages of Original Document).

* cited by examiner

Large
(e.g., 4K,
60fps) -
804

Medium
- 803

Small
- 802

Thumbnail res.
(sub-SD) - 801

*Region of Interest (ROI):*
Object recognition
806

*Region of Interest (ROI)*
Object recognition
805

*Full picture:*
Object detection &
localization extra-fast
partial decoding

DISTRIBUTED ANALYSIS OF A MULTI-LAYER SIGNAL ENCODING

CROSS-REFERENCE TO RELATED APPLICATIONS

This application is a 371 US Nationalization of International Application No. PCT/GB2021/052685, filed Oct. 15, 2021, which claims priority to United Kingdom Patent Application No. 2016457.0, filed Oct. 16, 2020, the disclosures of which are hereby incorporated by reference herein in their entirety.

TECHNICAL FIELD

The present disclosure relates to systems for performing automated analysis of digital signals, for example Artificial Intelligence ("AI") systems for performing object analysis and/or scene classification in a sequence of images. Moreover, the present disclosure relates to methods for operating aforesaid systems for performing analysis of data that is captured, encoded and/or archived in a location that is different from that of the system that performs analysis of the data. Furthermore, the present disclosure relates to a computer program product comprising a non-transitory computer-readable storage medium having computer-readable instructions stored thereon, the computer-readable instructions being executable by a computerized device comprising processing hardware to execute the aforesaid method. Certain examples described herein employ automatic deep-learning analysis for performing scene and/or object detection, classification, recognition and tagging of complex signals such as, by way of a non-limiting example, audio, image, video and immersive media signals. For simplicity, the present disclosure focuses on a case of video signals, but people skilled in the art are able to derive easily how the same concepts can be applied to automatic analysis of other types of signals than video signals.

BACKGROUND

It will be appreciated that temporally evolving signals such as video signals are typically represented by means of a sequence of samples in time (for example, a sequence of samples in time a rate of 60 Hz, or 60 samples per second), wherein each sample (for example, a video frame) comprises multiple colour planes (for example RGB, YUV, HSV, and so forth), wherein each colour plane comprises a high number of picture elements (for example, 3840×2160 picture element, or circa 8 million pixels for an Ultra HD full-resolution plane), and wherein each picture element value is represented with a value of given bit depth (for example, 8 bit, 10 bit, and so forth). All in all, it will be appreciated that uncompressed video signals require an extremely high amount of bits per second to be communicated from one given location to another location, such as 12 Gigabits (i.e., 1.5 GB) for just one second of 4:2:2 UHD 10-bit video signal.

Although there is much excitement about the power of artificial intelligence and neural network algorithms, the analysis of signals still suffers from fundamental problems of distribution. Many organisations have large data centres with many graphical or tensor processing units that are able to perform inference with complex neural network architectures. However, these complex neural network architectures are configured to receive and process high-resolution signals, such as high-resolution images or video feeds. One of the problems encountered is how to efficiently provide these data centres with high-resolution images or video feeds that form the input to the analysis; especially in cases where the sources of these feeds are geographically remote. As an example, a sporting match or music event may have many cameras that are capturing video data at high resolution; however, a high-speed connection to any data centre is required to process and mix this video data. For this reason, complex video analysis or mixing needs to be performed on-site; however, the processing resources for advanced neural network analysis may not be transplantable to a site of the match or event (as it may comprise advanced cooled processing equipment the size of a football field). Similar problems apply for high-quality audio signals from a remote event and/or edge sensor networks.

In more detail, one notable limitation of traditional approaches to perform AI analysis of image frames ensues whenever the signal to analyse is located in a place that is different from that of the computational resources that are meant to analyse it. This case is quite frequent for video signals, since video signals are captured "in field", often via light-weight cameras and/or edge devices, while sophisticated AI analyses require processing resources that are typically available in data centres (where often times neural network algorithms are also regularly retrained due to data coming from multiple locations). In order to face this challenge, the most common approaches are either to transfer the capacity of AI processing to edge devices (which generates cost inefficiencies and sacrifices the bounty of analysis, due to limitations in processing resources and availability of only local data for neural network training and machine learning purposes) or to somehow transfer all the video data to analyse from the edge to the data centre.

Solutions have been discussed that focus on transmitting features for artificial intelligence analysis. However, often there is no guidance on what these "features" should be. Typically, suggested solutions have some form of specific local feature extraction on-site, with this data being transmitted to data centres with processing resources for more complex analysis. However, this approach is inflexible, e.g. it is difficult to change the feature extraction. It often requires a local implementation of a portion of the neural network architecture that creates additional problems. Also, it is difficult to know ahead of analysis which features may be useful for the analysis.

SUMMARY

Aspects and variations of the present invention are set out in the appended claims.

Certain unclaimed aspects are further set out in the detailed description below.

DETAILED DESCRIPTION

Figure 1:
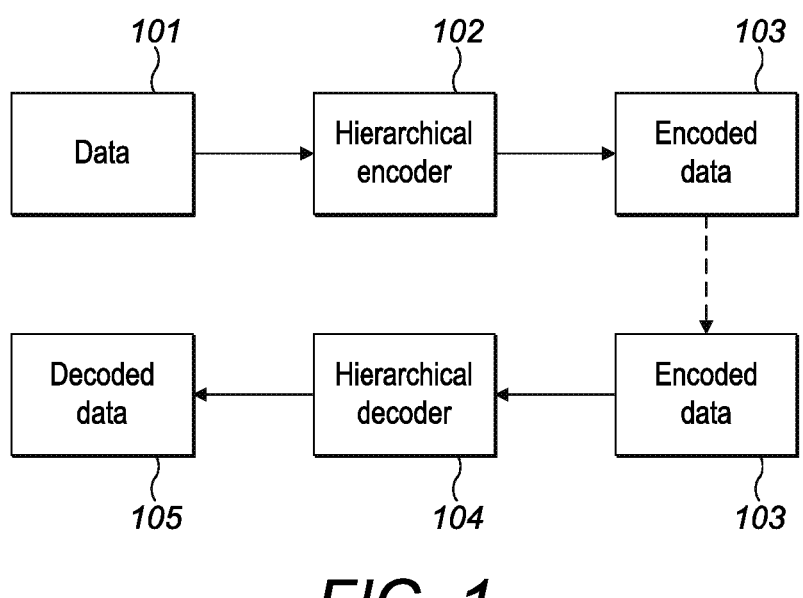
FIG. 1 shows a high-level schematic of a multi-layer or hierarchical encoding and decoding process.

Certain examples described herein relate to methods for encoding signals. Processing data may include, but is not limited to, obtaining, deriving, outputting, receiving and reconstructing data.

Certain examples described herein relate to distributed processing of signals. In particular, examples relate to encoding a signal using a multi-layer encoding (also referred to as a tier-based and/or hierarchical encoding), where different layers represent different levels of quality. These levels of quality may comprise different spatial resolutions, different bitrates for transmission, different levels of quantisation, different levels of sampling and/or different bit depths.

In tier-based coding formats such as ISO/IEC MPEG-5 Part 2 LCEVC (hereafter "LCEVC"), or SMPTE VC-6 2117 (hereafter "VC-6"), a signal is decomposed in multiple "echelons" (also known as "hierarchical tiers") of data, each corresponding to a "Level of Quality" ("LoQ") of the signal, from the highest echelon at the sampling rate of the original signal to a lowest echelon, which typically has a lower sampling rate than the original signal. In the non-limiting example when the signal is a frame of a video stream, the lowest echelon may be a thumbnail of the original frame, or even just a single picture element. Other echelons contain information on corrections to apply to a reconstructed rendition in order to produce the final output. Echelons may be based on residual information, e.g. a difference between a version of the original signal at a particular level of quality and a reconstructed version of the signal at the same level of quality. A lowest echelon may not comprise residual information but may comprise a lowest sampling of the original signal. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second—higher—Level of Quality, and so on, up to reconstructing the given Level of Quality. Reconstructing the signal may comprise decoding residual data and using this to correct a version at a particular Level of Quality that is derived from a version of the signal from a lower Level of Quality. Different echelons of data may be coded using different coding formats, and different Levels of Quality may have different sampling rates (e.g., resolutions, for the case of image or video signals). Subsequent echelons may refer to a same signal resolution (i.e., sampling rate) of the signal, or to a progressively higher signal resolution.

In preferred examples, the multi-layer coding schemes includes the video coding standard VC-6: SMPTE VC-6 ST-2117, as described in PCT/GB2018/053552 (and the associated published standard document), all of which are incorporated by reference herein. Certain examples may also use other multi-layer coding schemes such as LCEVC: MPEG-5 Part 2 LCEVC ("Low Complexity Enhancement Video Coding") as described in PCT/GB2020/050695 (and the associated published standard document), these documents also being incorporated herein by reference. However, the concepts illustrated herein need not be limited to these specific multi-layer coding schemes. In other examples, the multi-layer coding scheme may comprise a (scalable) wavelet-based coding scheme.

In certain examples, signal sources at the edge of a network, such as video cameras and/or microphones, output a set of full-quality signals that are then encoded at the edge using multi-layer coding formats, such as VC-6. Encoded data streams relating to lower levels in the multi-layer coding hierarchy or pyramid are transmitted over at least one network to a remote computing device for analysis. This remote computing device may comprise a so-called "cloud" server or data processing centre. The encoded data for the lower levels in the multi-layer coding hierarchy or pyramid are decoded and supplied to the remove computing device, which is then able to perform a first level of analysis on the reconstructions obtained from the encoded data for the lower levels. For example, these reconstructions may be a low resolution "thumbnail" frame or set of frames. The remote computing device may then base further analysis of the signals on the output of the first level of analysis. This may include requesting further encoded data that represents higher levels in the multi-layer coding hierarchy or pyramid. On receipt of this encoded data from the edge of the network, the remote computing device may be able to decode the further encoded data and perform further analysis of the signal based on reconstructions at a higher level of quality (e.g. reconstructions at a higher spatial resolution). This approach may be applied across a plurality of signal sources, such as a large set of video cameras recording a sporting or music event, where each camera is capturing action from a different position, angle and/or location. The present methods may thus be used to perform a rapid analysis on a plurality of smaller encoded data streams (e.g. from all capture devices) that may be easily transmitted over a network, and then only request a subset of additional encoded data for frames and/or capture devices of interest. For example, the location of a soccer ball may be determined based on an analysis of a set of reconstructions from multiple cameras and then further data may only be requested for cameras that are deemed, from the analysis, to contain the soccer ball. In this manner, an artificial intelligence mixing application may be provided. Hence, advanced and complex data centre processing may be performed remotely on efficiently communicated and reconstructed signal data.

For example, convolutional neural networks are commonly applied as part of a video analysis function at remote computing devices (e.g. so-called "cloud-based object recognition"). Multi-layer coding formats enable this video analysis to be accelerated multi-fold, and enables cloud-based analysis of edge video. Multi-layer coding formats such as VC-6 are natively 'friendly' to image recognition algorithms and can speedup processing by 5-10 times.

Certain examples described herein can address the problem of having multiple cameras, such as 20 video cameras streaming data at Ultra High Definitions (UHD) at 60 frames per second (UHDp60), and yet requiring video analysis to be performed on that streamed data. For example, there is often no available bandwidth between a point of capture, such as a football stadium or concert venue, and a site for advanced video analysis, such as a data centre implementing convolutional neural network architectures to recognise objects. Bringing the data centre to the football stadium is also not possible, even a modest processing infrastructure would be costly for occasional use, and/or require movement of a large amount of fixed processing hardware. However, using the present examples, encoding of the multi-layer format may be performed on site, and only a subset of layers is transmitted for analysis (typically the lower or lowest layers for the plurality of source devices). If the lower or lowest layers are transmitted, an encoded stream for the location may comprise a plurality of low bitrate encoded streams, e.g. low-resolution streams, which may be easily accommodated using existing bandwidth. Different sets of encoded data for higher layers may then be transmitted on-demand across a network to the data centre for further processing.

The presently described examples have advantages over comparative approaches to cope with both transmission constraints and processing power constraints. For example, one comparative approach is to decimate the video frames before the analysis. However, this has a disadvantage of potentially pruning useful frames before having had a chance to analyse their content. Large discrete changes between consecutive sets of analysed data due to the decimation may also "confuse" neural network architecture and/or make them inflexible to different sampling rates (e.g. a system trained on $\frac{1}{10}$ pruning may not be able to adapt to $\frac{1}{5}$ pruning). In contrast the present examples, allow higher frequency signal streams to be received by a remote location (e.g., avoiding the need for heavy decimation in time) as the lower layer signals are small and may be transmitted over constrained bandwidth connections. Hence, remote processing locations may receive near continuous sets of frames. Another comparative approach is to downscale each analysed frame to a lower resolution, e.g. prior to transmission to a remote processing location. However, this approach means that processing at the remote location is limited to the lower resolution reconstruction, e.g. potentially losing details that would improve classification accuracy. This can ultimately limit the overall classification performance of the system. In the present examples, a first encoded data stream is provided at a low resolution for initial analysis, but further detail may be efficiently requested and transmitted, e.g. without adaptation to the multi-layer encoding that can be used for full lossless encoding. For example, further encoded data may be requested by the remote processing location and may comprise residual data for a higher resolution that enhances an existing low-resolution reconstruction at the remote processing location. In implementations that encode the source signals with a plurality of layers, different layers may be requested and transmitted to selectively improve accuracy, effectively allowing AI processing algorithms to request "on-demand" the minimum amount of data to suitably analyse the edge data signals.

Introduction

As further background, examples described herein relate to signal processing. A signal may be considered as a sequence of samples (i.e., two-dimensional images, video frames, video fields, sound frames, etc.). In the description, the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

As examples, a signal can be an image, an audio signal, a multi-channel audio signal, a telemetry signal, a video signal, a 3DoF/6DoF video signal, a volumetric signal (e.g., medical imaging, scientific imaging, holographic imaging, etc.), a volumetric video signal, or even signals with more than four dimensions.

For simplicity, examples described herein often refer to signals that are displayed as 2D planes of settings (e.g., 2D images in a suitable colour space), such as for instance a video signal. The terms "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.).

Certain tier-based hierarchical formats described herein use a varying amount of correction (e.g., in the form of also "residual data", or simply "residuals") in order to generate a reconstruction of the signal at the given level of quality that best resembles (or even losslessly reconstructs) the original. The amount of correction may be based on a fidelity of a predicted rendition of a given level of quality.

Examples of a Tier-Based Hierarchical Coding Scheme or Format

In preferred examples, the encoders or decoders are part of a tier-based hierarchical coding scheme or format. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in PCT/GB2020/050695 (and the associated standard document) and the latter being described in PCT/GB2018/053552 (and the associated standard document), all of which are incorporated by reference herein. However, the concepts illustrated herein need not be limited to these specific hierarchical coding schemes. Certain examples described herein work optimally with a VC-6 encoding.

Figure 4:
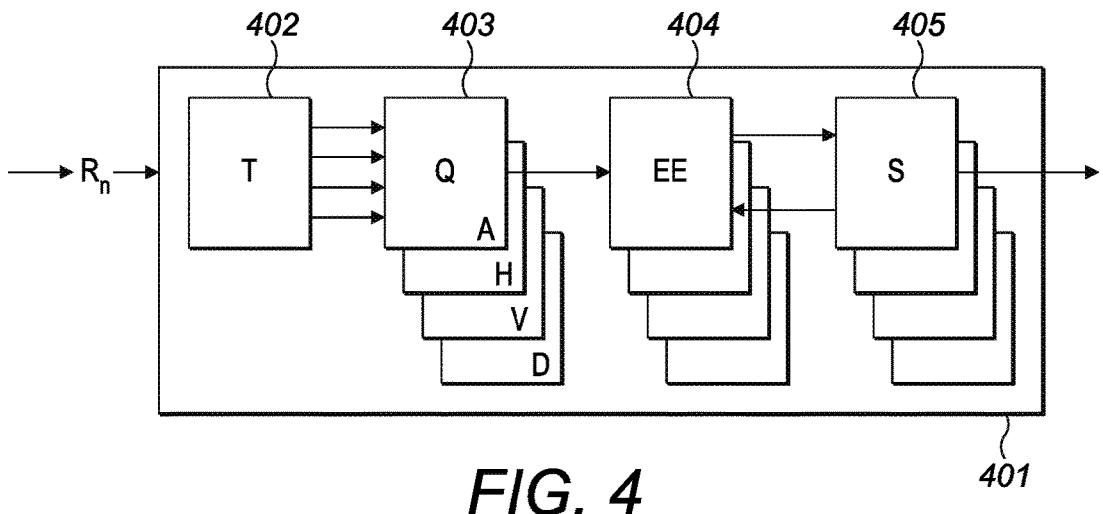
FIG. 4 shows a high-level schematic of an encoding process suitable for encoding the residuals of tiered outputs.
Figure 5:
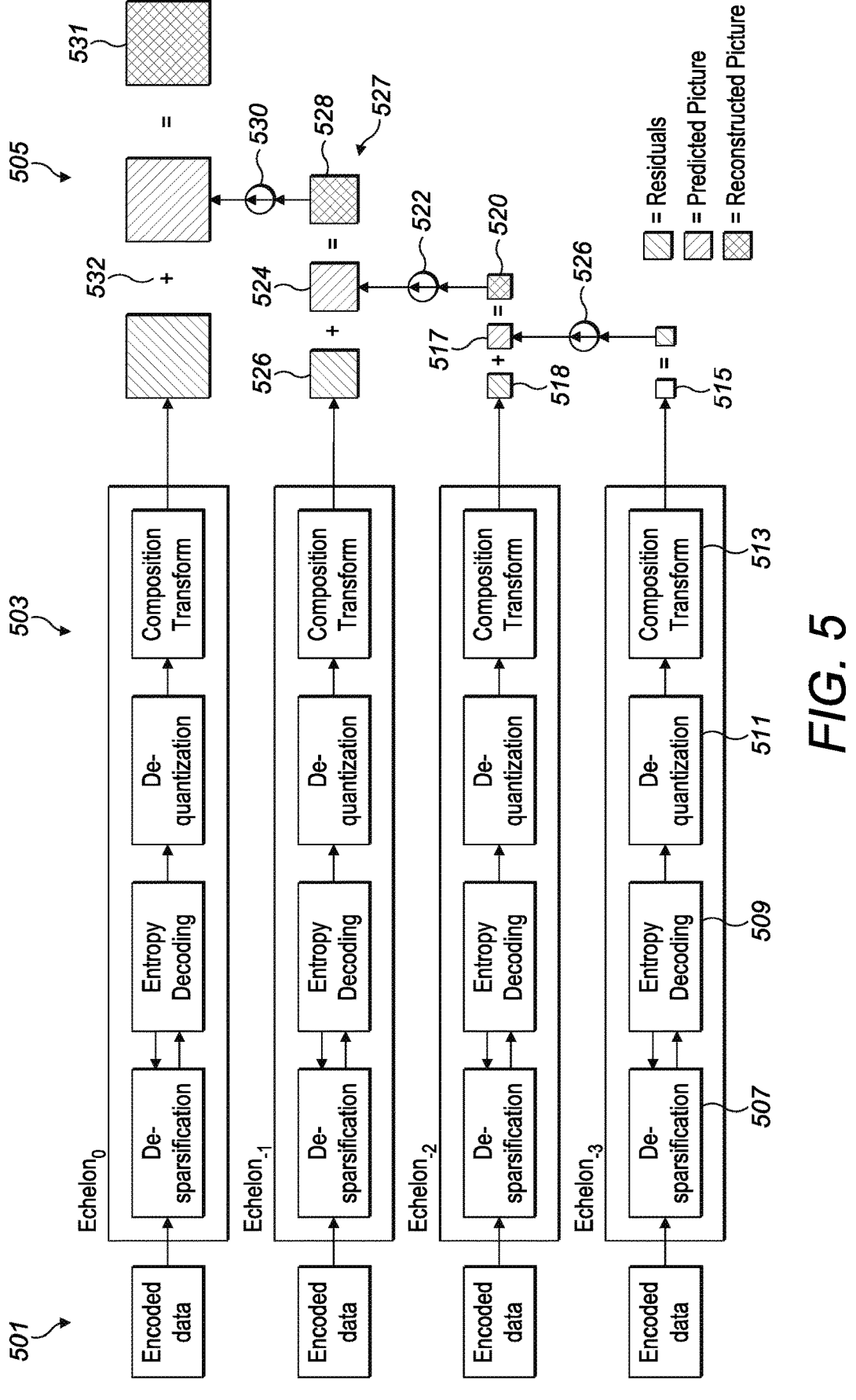
FIG. 5 shows a high-level schematic of a multi-layer decoding process suitable for decoding each output level from FIG. 4.
Figure 6:
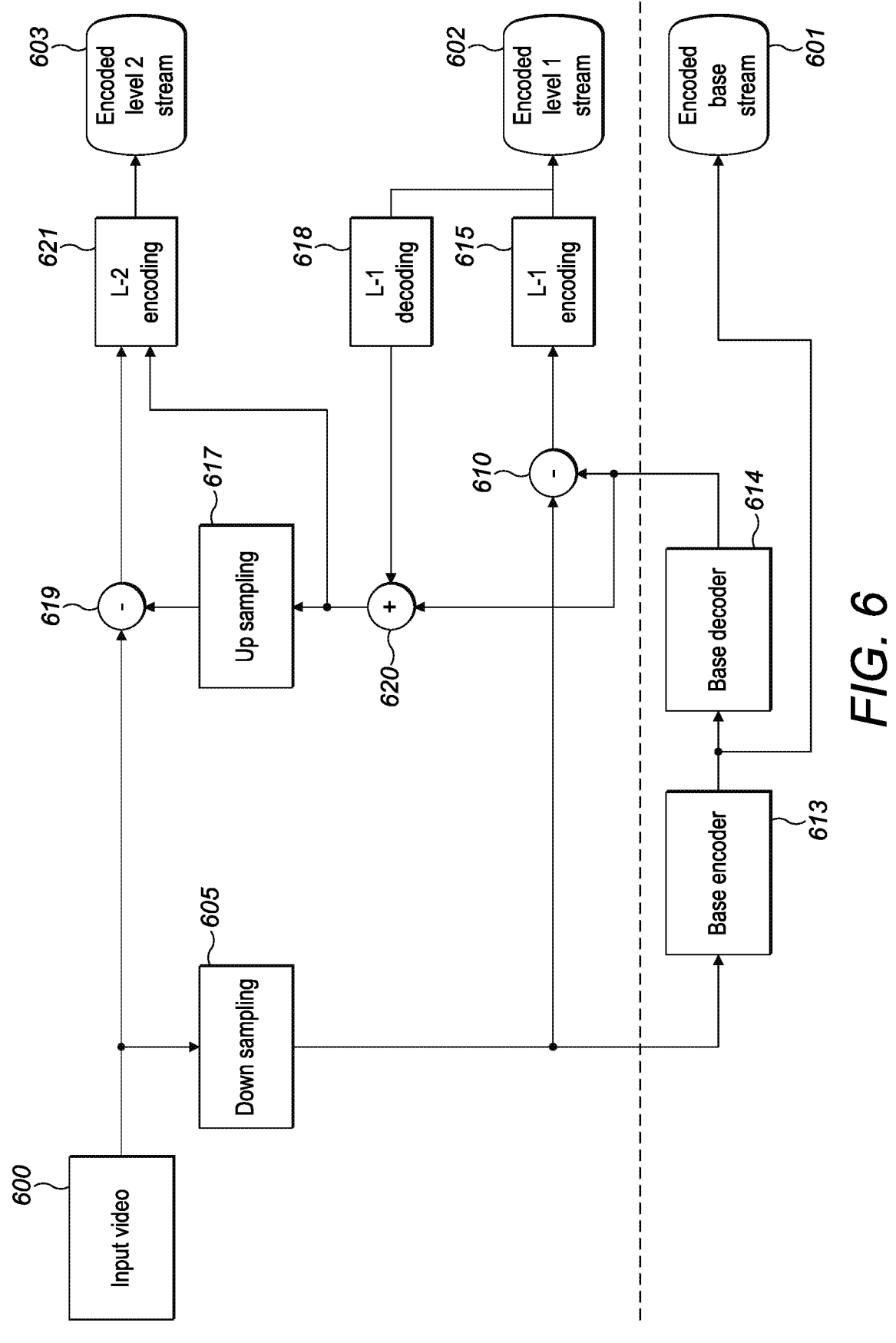
FIG. 6 shows a high-level schematic of an encoding process of a multi-layer coding technology.
Figure 7:
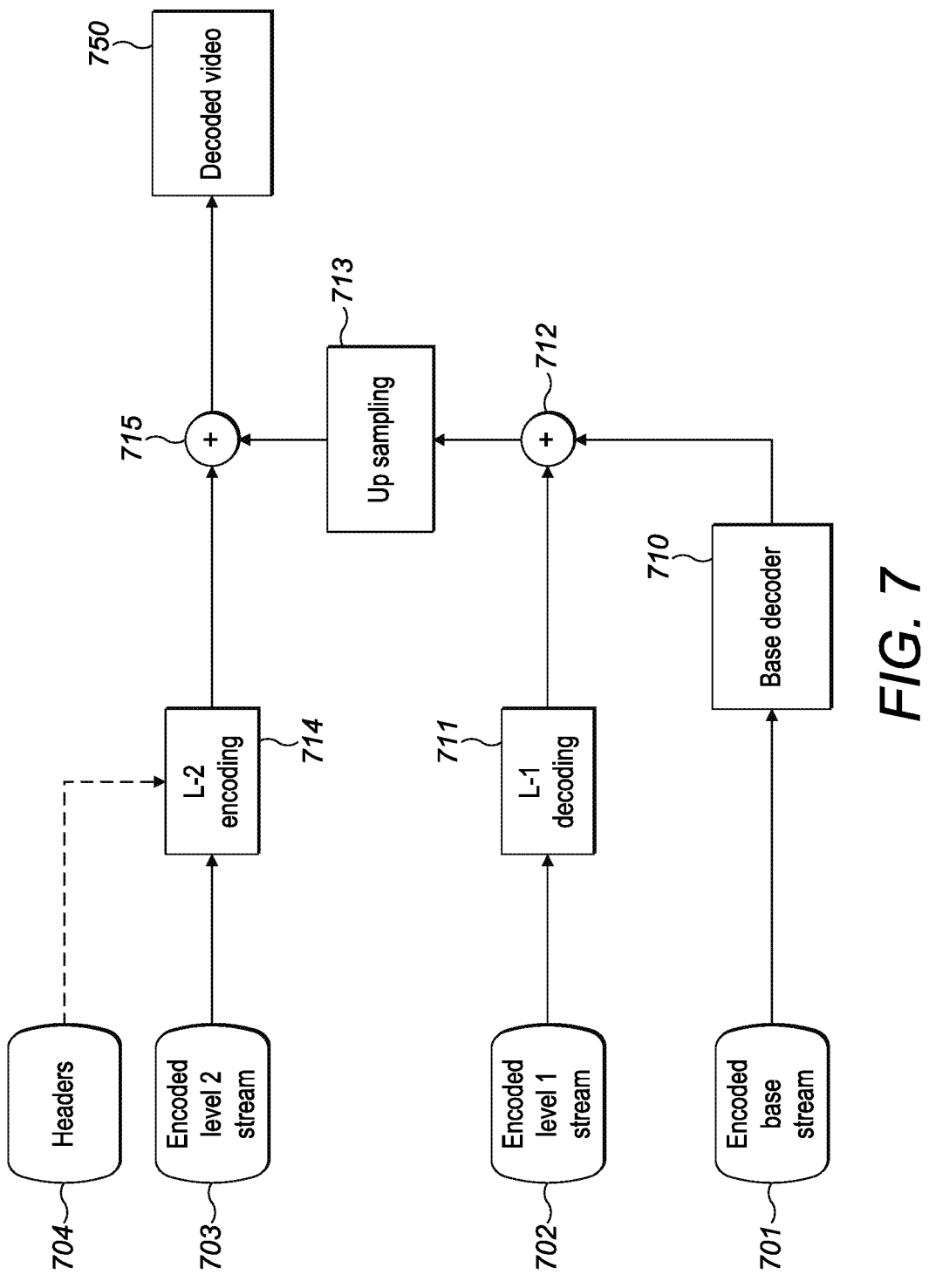
FIG. 7 shows a high-level schematic of a decoding process suitable for decoding the output of FIG. 6.

FIGS. 1 to 7 provide an overview of different example tier-based hierarchical coding formats. These are provided as context for the addition of further signal processing operations, which are set out in the Figures following FIG. 7. FIGS. 1 to 5 provide examples similar to the implementation of SMPTE VC-6 ST-2117, whereas FIGS. 6 and 7 provide examples similar to the implementation of MPEG-5 Part 2 LCEVC. It may be seen that both sets of examples utilise common underlying operations (e.g., downsampling, upsampling and residual generation) and may share modular implementing technologies.

FIG. 1 illustrates, very generally, a hierarchical coding scheme. Data to be encoded 101 is retrieved by a hierarchical encoder 102 which outputs encoded data 103.

Subsequently, the encoded data 103 is received by a hierarchical decoder 104 which decodes the data and outputs decoded data 105.

Typically, the hierarchical coding schemes used in examples herein create a base or core level, which is a representation of the original data at a lower level of quality and one or more levels of residuals which can be used to recreate the original data at a higher level of quality using a decoded version of the base level data. In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame.

It should be noted that the generalised examples are agnostic as to the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data.

In specific examples, the data may be an image or video. In these examples, the set of residuals corresponds to an image or frame of the video, with each residual being associated with a pixel of the signal, the pixel being the signal element.

The methods described herein may be applied to so-called planes of data that reflect different colour components of a video signal. For example, the methods may be applied to different planes of YUV or RGB data reflecting different colour channels. Different colour channels may be processed in parallel. The components of each stream may be collated in any logical order.

A hierarchical coding scheme will now be described in which the concepts of the invention may be deployed. The scheme is conceptually illustrated in FIGS. 2 to 5 and corresponds generally to VC-6 described above. In such encoding techniques, residuals data is used in progressively higher levels of quality. In this proposed technique, a core layer represents the image at a first resolution and subsequent layers in the tiered hierarchy are residual data or adjustment layers necessary for the decoding side to reconstruct the image at a higher resolution. Each layer or level may be referred to as an echelon index, such that the residuals data is data required to correct low quality information present in a lower echelon index. Each layer or echelon index in this hierarchical technique, particularly each residual layer, is often a comparatively sparse data set having many zero value elements. When reference is made to an echelon index, it refers collectively to all echelons or sets of components at that level, for example, all subsets arising from a transform step performed at that level of quality.

In this particular hierarchical manner, the described data structure removes any requirement for, or dependency on, the preceding or proceeding level of quality. A level of quality may be encoded and decoded separately, and without reference to any other layer. Thus, in contrast to many known other hierarchical encoding schemes, where there is a requirement to decode the lowest level of quality in order to decode any higher levels of quality, the described methodology does not require the decoding of any other layer. Nevertheless, the principles of exchanging information described below may also be applicable to other hierarchical coding schemes.

Figure 2:
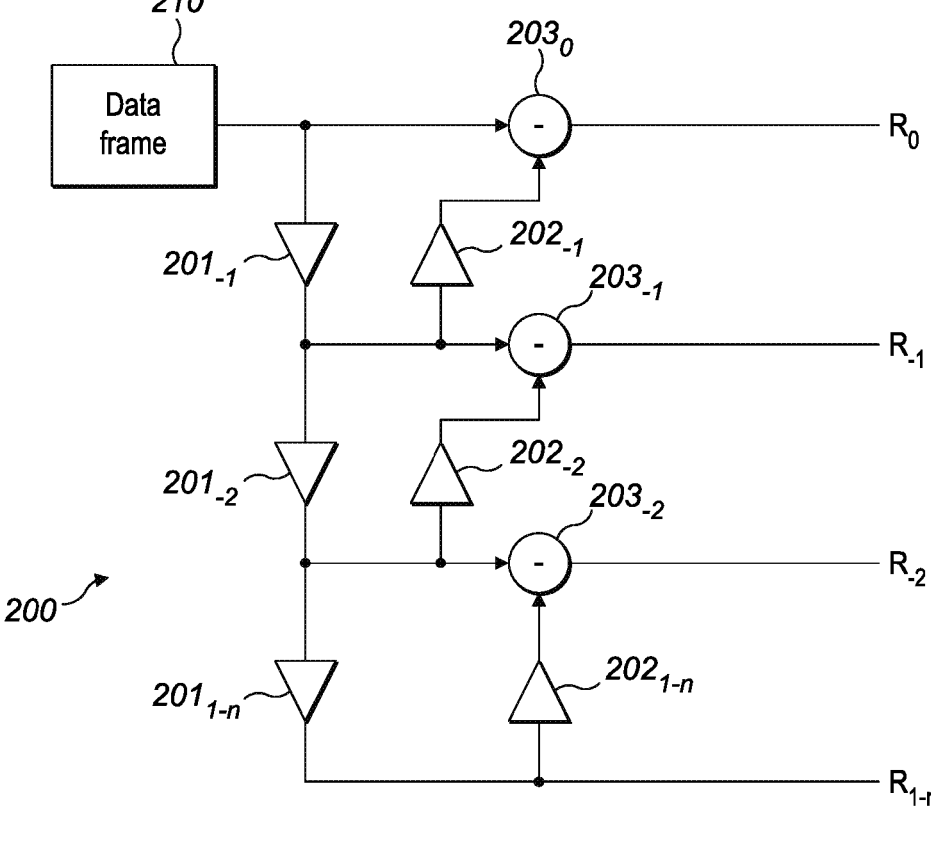
FIG. 2 shows a high-level schematic of a multi-layer deconstruction process.

As shown in FIG. 2, the encoded data represents a set of layers or levels, generally referred to here as echelon indices. The base or core level represents the original data frame 210, albeit at the lowest level of quality or resolution and the subsequent residuals data echelons can combine with the data at the core echelon index to recreate the original image at progressively higher resolutions.

To create the core-echelon index, an input data frame 210 may be down-sampled using a number of down-sampling operations 201 corresponding to the number of levels or echelon indices to be used in the hierarchical coding operation. One fewer down-sampling operation 201 is required than the number of levels in the hierarchy. In all examples illustrated herein, there are 4 levels or echelon indices of output encoded data and accordingly 3 down-sampling operations, but it will of course be understood that these are merely for illustration. Where n indicates the number of levels, the number of down-samplers is n-1. The core level $R_{1-n}$ is the output of the third down-sampling operation. As indicated above, the core level $R_{1-n}$ corresponds to a representation of the input data frame at a lowest level of quality.

To distinguish between down-sampling operations 201, each will be referred to in the order in which the operation is performed on the input data 210 or by the data which its output represents. For example, the third down-sampling operation $201_{1-n}$ in the example may also be referred to as the core down-sampler as its output generates the core-echelon index or $echelon_{1-n}$, that is, the index of all echelons at this level is 1-n. Thus, in this example, the first down-sampling operation $201_{-1}$ corresponds to the $R_{-1}$ down-sampler, the second down-sampling operation $201_{-2}$ corresponds to the $R_{-2}$ down-sampler and the third down-sampling operation $201_{1-n}$ corresponds to the core or $R_{-3}$ down-sampler.

As shown in FIG. 2, the data representing the core level of quality $R_{1-n}$ undergoes an up-sampling operation $202_{1-n}$, referred to here as the core up-sampler. A difference $203_{-2}$ between the output of the second down-sampling operation $201_{-2}$ (the output of the $R_{-2}$ down-sampler, i.e. the input to the core down-sampler) and the output of the core up-sampler $202_{1-n}$ is output as the first residuals data $R_{-2}$. This first residuals data $R_{-2}$ is accordingly representative of the error between the core level $R_{-3}$ and the signal that was used to create that level. Since that signal has itself undergone two down-sampling operations in this example, the first residuals data $R_{-2}$ is an adjustment layer which can be used to recreate the original signal at a higher level of quality than the core level of quality but a lower level than the input data frame 210.

Figure 3:
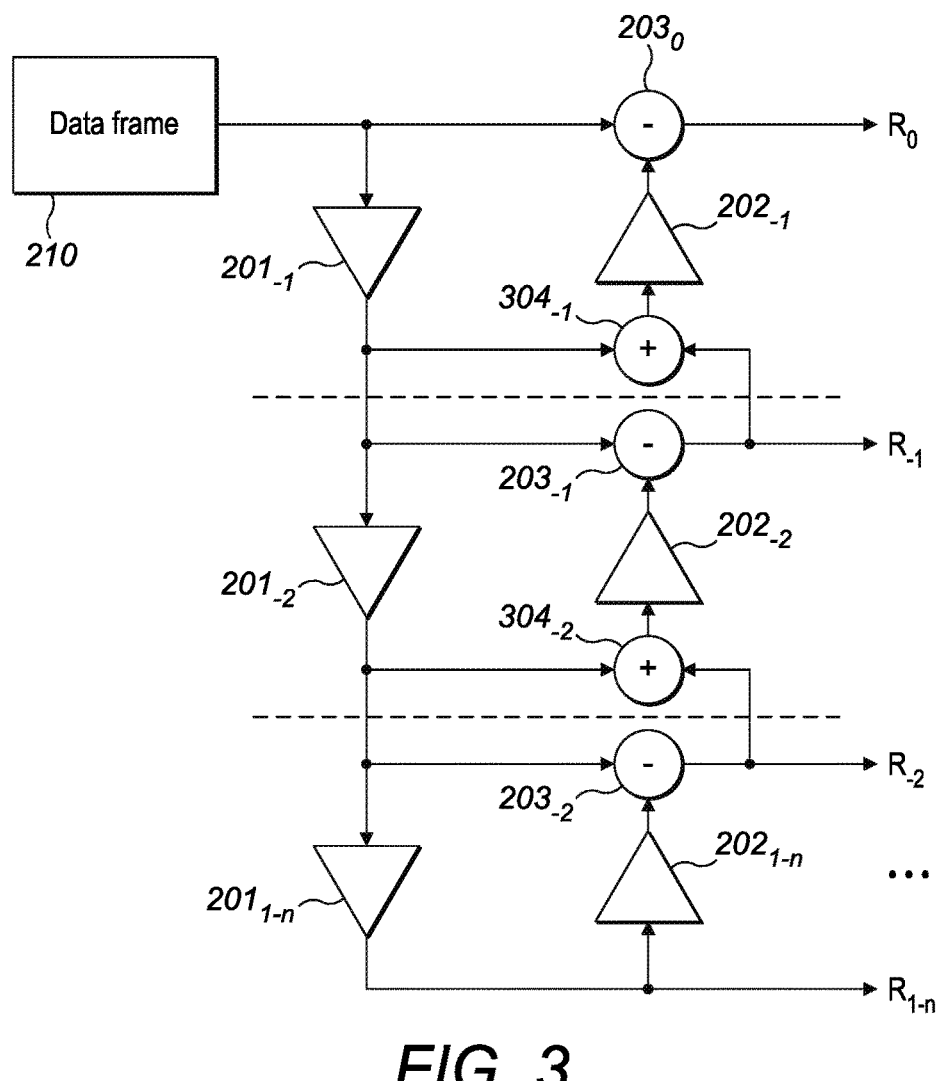
FIG. 3 shows an alternative high-level schematic of a multi-layer deconstruction process.

Variations in how to create residuals data representing higher levels of quality are conceptually illustrated in FIGS. 2 and 3.

In FIG. 2, the output of the second down-sampling operation $201_{-2}$ (or $R_{-2}$ down-sampler, i.e. the signal used to create the first residuals data $R_{-2}$), is up-sampled $202_{-2}$ and the difference $203_{-1}$ between the input to the second down-sampling operation $201_{-2}$ (or $R_{-2}$ down-sampler, i.e. the output of the $R_{-1}$ down-sampler) is calculated in much the same way as the first residuals data $R_{-2}$ is created. This difference is accordingly the second residuals data $R_{-1}$ and represents an adjustment layer which can be used to recreate the original signal at a higher level of quality using the data from the lower layers.

In the variation of FIG. 3, however, the output of the second down-sampling operation $201_{-2}$ (or $R_{-2}$ down-sampler) is combined or summed $304_{-2}$ with the first residuals data $R_{-2}$ to recreate the output of the core up-sampler $202_{1-n}$. In this variation it is this recreated data which is up-sampled $202_{-2}$ rather than the down-sampled data. The up-sampled data is similarly compared $203_{-1}$ to the input to the second down-sampling operation (or $R_{-2}$ down-sampler, i.e. the output of the $R_{-1}$ down-sampler) to create the second residuals data $R_{-1}$.

The variation between the implementations of FIGS. 2 and 3 results in slight variations in the residuals data between the two implementations. FIG. 2 benefits from greater potential for parallelisation.

The process or cycle repeats to create the third residuals $R_0$. In the examples of FIGS. 2 and 3, the output residuals data $R_0$ (i.e. the third residuals data) corresponds to the highest level and is used at the decoder to recreate the input data frame. At this level the difference operation is based on the input data frame which is the same as the input to the first down-sampling operation.

FIG. 4 illustrates an example encoding process 401 for encoding each of the levels or echelon indices of data to produce a set of encoded echelons of data having an echelon index. This encoding process is used merely for example of a suitable encoding process for encoding each of the levels, but it will be understood that any suitable encoding process may be used. The input to the process is a respective level of residuals data output from FIG. 2 or 3 and the output is a set of echelons of encoded residuals data, the echelons of encoded residuals data together hierarchically represent the encoded data.

In a first step, a transform 402 is performed. The transform may be directional decomposition transform as described in WO2013/171173 or a wavelet or discrete cosine transform. If a directional decomposition transform is used, there may be output a set of four components (also referred to as transformed coefficients). When reference is made to an echelon index, it refers collectively to all directions (A, H, V, D), i.e., 4 echelons. The component set is then quantized 403 before entropy encoding. In this example, the entropy encoding operation 404 is coupled to a sparsification step 405 which takes advantage of the sparseness of the residuals data to reduce the overall data size and involves mapping data elements to an ordered quadtree. Such coupling of entropy coding and sparsification is described further in WO2019/111004 but the precise details of such a process is not relevant to the understanding of the invention. Each array of residuals may be thought of as an echelon.

The process set out above corresponds to an encoding process suitable for encoding data for reconstruction according to SMPTE ST 2117, VC-6 Multiplanar Picture Format. VC-6 is a flexible, multi-resolution, intra-only bitstream format, capable of compressing any ordered set of integer element grids, each of independent size but is also designed for picture compression. It employs data agnostic techniques for compression and is capable of compressing low or high bit-depth pictures. The bitstream's headers can contain a variety of metadata about the picture.

As will be understood, each echelon or echelon index may be implemented using a separate encoder or encoding operation. Similarly, an encoding module may be divided into the steps of down-sampling and comparing, to produce the residuals data, and subsequently encoding the residuals or alternatively each of the steps of the echelon may be implemented in a combined encoding module. Thus, the process may be for example be implemented using 4 encoders, one for each echelon index, 1 encoder and a plurality of encoding modules operating in parallel or series, or one encoder operating on different data sets repeatedly.

The following sets out an example of reconstructing an original data frame, the data frame having been encoded using the above exemplary process. This reconstruction process may be referred to as pyramidal reconstruction. Advantageously, the method provides an efficient technique for reconstructing an image encoded in a received set of data, which may be received by way of a data stream, for example, by way of individually decoding different component sets corresponding to different image size or resolution levels, and combining the image detail from one decoded component set with the upscaled decoded image data from a lower-resolution component set. Thus by performing this process for two or more component sets, digital images at the structure or detail therein may be reconstructed for progressively higher resolutions or greater numbers of pixels, without requiring the full or complete image detail of the highest-resolution component set to be received. Rather, the method facilitates the progressive addition of increasingly higher-resolution details while reconstructing an image from a lower-resolution component set, in a staged manner.

Moreover, the decoding of each component set separately facilitates the parallel processing of received component sets, thus improving reconstruction speed and efficiency in implementations wherein a plurality of processes is available.

Each resolution level corresponds to a level of quality or echelon index. This is a collective term, associated with a plane (in this example a representation of a grid of integer value elements) that describes all new inputs or received component sets, and the output reconstructed image for a cycle of index-m. The reconstructed image in echelon index zero, for instance, is the output of the final cycle of pyramidal reconstruction.

Pyramidal reconstruction may be a process of reconstructing an inverted pyramid starting from the initial echelon index and using cycles by new residuals to derive higher echelon indices up to the maximum quality, quality zero, at echelon index zero. A cycle may be thought of as a step in such pyramidal reconstruction, the step being identified by an index-m. The step typically comprises up-sampling data output from a possible previous step, for instance, upscaling the decoded first component set, and takes new residual data as further inputs in order to obtain output data to be up-sampled in a possible following step. Where only first and second component sets are received, the number of echelon indices will be two, and no possible following step is present. However, in examples where the number of component sets, or echelon indices, is three or greater, then the output data may be progressively upsampled in the following steps.

The first component set typically corresponds to the initial echelon index, which may be denoted by echelon index 1-N, where N is the number of echelon indices in the plane.

Typically, the upscaling of the decoded first component set comprises applying an upsampler to the output of the decoding procedure for the initial echelon index. In examples, this involves bringing the resolution of a reconstructed picture output from the decoding of the initial echelon index component set into conformity with the resolution of the second component set, corresponding to 2-N. Typically, the upscaled output from the lower echelon index component set corresponds to a predicted image at the higher echelon index resolution. Owing to the lower-resolution initial echelon index image and the up-sampling process, the predicted image typically corresponds to a smoothed or blurred picture.

Adding to this predicted picture higher-resolution details from the echelon index above provides a combined, reconstructed image set. Advantageously, where the received component sets for one or more higher-echelon index component sets comprise residual image data, or data indicating the pixel value differences between upscaled predicted pictures and original, uncompressed, or pre-encoding images, the amount of received data required in order to reconstruct an image or data set of a given resolution or quality may be considerably less than the amount or rate of data that would be required in order to receive the same quality image using other techniques. Thus, by combining low-detail image data received at lower resolutions with progressively greater-detail image data received at increasingly higher resolutions in accordance with the method, data rate requirements are reduced.

Typically, the set of encoded data comprises one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

In this way, the method may involve taking the reconstructed image output of a given component set level or echelon index, upscaling that reconstructed set, and combining it with the decoded output of the component set or echelon index above, to produce a new, higher resolution reconstructed picture. It will be understood that this may be performed repeatedly, for progressively higher echelon indices, depending on the total number of component sets in the received set.

In typical examples, each of the component sets corresponds to a progressively higher image resolution, wherein each progressively higher image resolution corresponds to a factor-of-four increase in the number of pixels in a corresponding image. Typically, therefore, the image size corresponding to a given component set is four times the size or number of pixels, or double the height and double the width, of the image corresponding to the component set below, that is the component set with the echelon index one less than the echelon index in question. A received set of component sets in which the linear size of each corresponding image is double with respect to the image size below may facilitate more simple upscaling operations, for example.

In the illustrated example, the number of further component sets is two. Thus, the total number of component sets in the received set is four. This corresponds to the initial echelon index being echelon-3.

The first component set may correspond to image data, and the second and any further component sets correspond to residual image data. As noted above, the method provides particularly advantageous data rate requirement reductions for a given image size in cases where the lowest echelon index, that is the first component set, contains a low resolution, or down sampled, version of the image being transmitted. In this way, with each cycle of reconstruction, starting with a low resolution image, that image is upscaled so as to produce a high resolution albeit smoothed version, and that image is then improved by way of adding the differences between that upscaled predicted picture and the actual image to be transmitted at that resolution, and this additive improvement may be repeated for each cycle. Therefore, each component set above that of the initial echelon index needs only contain residual data in order to reintroduce the information that may have been lost in down sampling the original image to the lowest echelon index.

The method provides a way of obtaining image data, which may be residual data, upon receipt of a set containing data that has been compressed, for example, by way of decomposition, quantization, entropy-encoding, and sparsification, for instance. The sparsification step is particularly advantageous when used in connection with sets for which the original or pre-transmission data was sparse, which may typically correspond to residual image data. A residual may be a difference between elements of a first image and elements of a second image, typically co-located. Such residual image data may typically have a high degree of sparseness. This may be thought of as corresponding to an image wherein areas of detail are sparsely distributed amongst areas in which details are minimal, negligible, or absent. Such sparse data may be described as an array of data wherein the data are organised in at least a two-dimensional structure (e.g., a grid), and wherein a large portion of the data so organised are zero (logically or numerically) or are considered to be below a certain threshold. Residual data are just one example. Additionally, metadata may be sparse and so be reduced in size to a significant degree by this process. Sending data that has been sparsified allows a significant reduction in required data rate to be achieved by way of omitting to send such sparse areas, and instead reintroducing them at appropriate locations within a received byteset at a decoder.

Typically, the entropy-decoding, de-quantizing, and directional composition transform steps are performed in accordance with parameters defined by an encoder or a node from which the received set of encoded data is sent. For each echelon index, or component set, the steps serve to decode image data so as to arrive at a set which may be combined with different echelon indices as per the technique disclosed above, while allowing the set for each level to be transmitted in a data-efficient manner.

There may also be provided a method of reconstructing a set of encoded data according to the method disclosed above, wherein the decoding of each of the first and second component sets is performed according to the method disclosed above. Thus, the advantageous decoding method of the present disclosure may be utilised for each component set or echelon index in a received set of image data and reconstructed accordingly.

With reference to FIG. 5, a decoding example is now described. A set of encoded data 501 is received, wherein the set comprises four echelon indices, each echelon index comprising four echelons: from echelon$_0$, the highest resolution or level of quality, to echelon$_{-3}$, the initial echelon. The image data carried in the echelon$_{-3}$ component set corresponds to image data, and the other component sets contain residual data for that transmitted image. While each of the levels may output data that can be considered as residuals, the residuals in the initial echelon level, that is echelon$_{-3}$, effectively correspond to the actual reconstructed image. At stage 503, each of the component sets is processed in parallel so as to decode that encoded set.

With reference to the initial echelon index, or the core-echelon index, the following decoding steps are carried out for each component set echelon$_{-3}$ to echelon0.

At step 507, the component set is de-sparsified. De-sparsification may be an optional step that is not performed in other tier-based hierarchical formats. In this example, the de-sparsification causes a sparse two-dimensional array to be recreated from the encoded byteset received at each echelon. Zero values grouped at locations within the two-dimensional array which were not received (owing to there being omitted from the transmitted byteset in order to reduce the quantity of data transmitted) are repopulated by this process. Non-zero values in the array retain their correct values and positions within the recreated two-dimensional array, with the de-sparsification step repopulating the transmitted zero values at the appropriate locations or groups of locations there between.

At step 509, a range decoder, the configured parameters of which correspond to those using which the transmitted data was encoded prior to transmission, is applied to the de-sparsified set at each echelon in order to substitute the encoded symbols within the array with pixel values. The encoded symbols in the received set are substituted for pixel values in accordance with an approximation of the pixel value distribution for the image. The use of an approximation of the distribution, that is relative frequency of each value across all pixel values in the image, rather than the true distribution, permits a reduction in the amount of data required to decode the set, since the distribution information is required by the range decoder in order to carry out this step. As described in the present disclosure, the steps of de-sparsification and range decoding are interdependent, rather than sequential. This is indicated by the loop formed by the arrows in the flow diagram.

At step 511, the array of values is de-quantized. This process is again carried out in accordance with the parameters with which the decomposed image was quantized prior to transmission.

Following de-quantization, the set is transformed at step 513 by a composition transform which comprises applying an inverse directional decomposition operation to the de-quantized array. This causes the directional filtering, according to an operator set comprising average, horizontal, vertical, and diagonal operators, to be reversed, such that the resultant array is image data for echelon$_{-3}$ and residual data for echelon$_{-2}$ to echelon$_0$.

Stage 505 illustrates the several cycles involved in the reconstruction utilising the output of the composition transform for each of the echelon component sets 501. Stage 515 indicates the reconstructed image data output from the decoder 503 for the initial echelon. In an example, the reconstructed picture 515 has a resolution of 64×64. At 516, this reconstructed picture is up-sampled so as to increase its constituent number of pixels by a factor of four, thereby a predicted picture 517 having a resolution of 128×128 is produced. At stage 520, the predicted picture 517 is added to the decoded residuals 518 from the output of the decoder at echelon$_{-2}$. The addition of these two 128×128-size images produces a 128×128-size reconstructed image, containing the smoothed image detail from the initial echelon enhanced by the higher-resolution detail of the residuals from echelon$_{-2}$. This resultant reconstructed picture 519 may be output or displayed if the required output resolution is that corresponding to echelon$_{-2}$. In the present example, the reconstructed picture 519 is used for a further cycle. At step 512, the reconstructed image 519 is up-sampled in the same manner as at step 516, so as to produce a 256×256-size predicted picture 524. This is then combined at step 528 with the decoded echelon$_{-1}$ output 526, thereby producing a 256×256-size reconstructed picture 527 which is an upscaled version of prediction 519 enhanced with the higher-resolution details of residuals 526. At 530 this process is repeated a final time, and the reconstructed picture 527 is upscaled to a resolution of 512×512, for combination with the echelon0 residual at stage 532. Thereby a 512×512 reconstructed picture 531 is obtained.

A further hierarchical coding technology with which the principles of the present invention may be utilised is illustrated in FIGS. 6 and 7. This technology is a flexible, adaptable, highly efficient and computationally inexpensive coding format which combines a different video coding format, a base codec, (e.g., AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture. Thus, the streams are considered to be a base stream and an enhancement stream, which may be further multiplexed or otherwise combined to generate an encoded data stream. In certain cases, the base stream and the enhancement stream may be transmitted separately. References to an encoded data as described herein may refer to the enhancement stream or a combination of the base stream and the enhancement stream. The base stream may be decoded by a hardware decoder while the enhancement stream is may be suitable for software processing implementation with suitable power consumption. This general encoding structure creates a plurality of degrees of freedom that allow great flexibility and adaptability to many situations, thus making the coding format suitable for many use cases including OTT transmission, live streaming, live ultra-high-definition UHD broadcast, and so on. Although the decoded output of the base codec is not intended for viewing, it is a fully decoded video at a lower resolution, making the output compatible with existing decoders and, where considered suitable, also usable as a lower resolution output.

In certain examples, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 6. An input video 600 at an initial resolution is processed to generate various encoded streams 601, 602, 603. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 6 may provide a general low complexity encoder. In certain cases, the enhancement streams may be generated by encoding processes that form part of the low complexity encoder and the low complexity encoder may be configured to control an independent base encoder and decoder (e.g., as packaged as a base codec). In other cases, the base encoder and decoder may be supplied as part of the low complexity encoder. In one case, the low complexity encoder of FIG. 6 may be seen as a form of wrapper for the base codec, where the functionality of the base codec may be hidden from an entity implementing the low complexity encoder.

A down-sampling operation illustrated by down-sampling component 105 may be applied to the input video to produce a down-sampled video to be encoded by a base encoder 613 of a base codec. The down-sampling can be done either in both vertical and horizontal directions, or alternatively only in the horizontal direction. The base encoder 613 and a base decoder 614 may be implemented by a base codec (e.g., as different functions of a common codec). The base codec, and/or one or more of the base encoder 613 and the base decoder 614 may comprise suitably configured electronic circuitry (e.g., a hardware encoder/decoder) and/or computer program code that is executed by a processor.

Each enhancement stream encoding process may not necessarily include an upsampling step. In FIG. 6 for example, the first enhancement stream is conceptually a correction stream while the second enhancement stream is upsampled to provide a level of enhancement.

Looking at the process of generating the enhancement streams in more detail, to generate the encoded Level 1 stream, the encoded base stream is decoded by the base decoder 614 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 610 (i.e. a subtraction operation is applied to the down-sampled input video and the decoded base stream to generate a first set of residuals).

The output of the comparator 610 may be referred to as a first set of residuals, e.g. a surface or frame of residual data, where a residual value is determined for each picture element at the resolution of the base encoder 613, the base decoder 614 and the output of the down-sampling block 605.

The difference is then encoded by a first encoder 615 (i.e. a level 1 encoder) to generate the encoded Level 1 stream 602 (i.e. an encoding operation is applied to the first set of residuals to generate a first enhancement stream).

As noted above, the enhancement stream may comprise a first level of enhancement 602 and a second level of enhancement 603. The first level of enhancement 602 may be considered to be a corrected stream, e.g. a stream that provides a level of correction to the base encoded/decoded video signal at a lower resolution than the input video 600. The second level of enhancement 603 may be considered to be a further level of enhancement that converts the corrected stream to the original input video 600, e.g. that applies a level of enhancement or correction to a signal that is reconstructed from the corrected stream.

In the example of FIG. 6, the second level of enhancement 603 is created by encoding a further set of residuals. The further set of residuals are generated by a level 2 comparator 619. The level 2 comparator 619 determines a difference between an upsampled version of a decoded level 1 stream, e.g. the output of an upsampling component 617, and the input video 600. The input to the up-sampling component 617 is generated by applying a first decoder (i.e. a level 1 decoder) to the output of the first encoder 615. This generates a decoded set of level 1 residuals. These are then combined with the output of the base decoder 614 at summation component 620. This effectively applies the level 1 residuals to the output of the base decoder 614. It allows for losses in the level 1 encoding and decoding process to be corrected by the level 2 residuals. The output of summation component 620 may be seen as a simulated signal that represents an output of applying level 1 processing to the encoded base stream 601 and the encoded level 1 stream 602 at a decoder.

As noted, an upsampled stream is compared to the input video which creates a further set of residuals (i.e. a difference operation is applied to the upsampled re-created stream to generate a further set of residuals). The further set of residuals are then encoded by a second encoder 621 (i.e. a level 2 encoder) as the encoded level 2 enhancement stream (i.e. an encoding operation is then applied to the further set of residuals to generate an encoded further enhancement stream).

Thus, as illustrated in FIG. 6 and described above, the output of the encoding process is a base stream 601 and one or more enhancement streams 602, 603 which preferably comprise a first level of enhancement and a further level of enhancement. The three streams 601, 602 and 603 may be combined, with or without additional information such as control headers, to generate a combined stream for the video encoding framework that represents the input video 600. It should be noted that the components shown in FIG. 6 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g., either spatial dependencies or temporal dependencies). The dependencies of comparative video encoding schemes limit the level of parallelism and require a much higher complexity.

A corresponding generalised decoding process is depicted in the block diagram of FIG. 7. FIG. 7 may be said to show a low complexity decoder that corresponds to the low complexity encoder of FIG. 6. The low complexity decoder receives the three streams 601, 602, 603 generated by the low complexity encoder together with headers 704 containing further decoding information. The encoded base stream 601 is decoded by a base decoder 710 corresponding to the base codec used in the low complexity encoder. The encoded level 1 stream 602 is received by a first decoder 711 (i.e. a level 1 decoder), which decodes a first set of residuals as encoded by the first encoder 615 of FIG. 1. At a first summation component 712, the output of the base decoder 710 is combined with the decoded residuals obtained from the first decoder 711. The combined video, which may be said to be a level 1 reconstructed video signal, is upsampled by upsampling component 713. The encoded level 2 stream 103 is received by a second decoder 714 (i.e. a level 2 decoder). The second decoder 714 decodes a second set of residuals as encoded by the second encoder 621 of FIG. 1. Although the headers 704 are shown in FIG. 7 as being used by the second decoder 714, they may also be used by the first decoder 711 as well as the base decoder 710. The output of the second decoder 714 is a second set of decoded residuals. These may be at a higher resolution to the first set of residuals and the input to the upsampling component 713. At a second summation component 715, the second set of residuals from the second decoder 714 are combined with the output of the up-sampling component 713, i.e. an up-sampled reconstructed level 1 signal, to reconstruct decoded video 750.

As per the low complexity encoder, the low complexity decoder of FIG. 7 may operate in parallel on different blocks or coding units of a given frame of the video signal. Additionally, decoding by two or more of the base decoder 710, the first decoder 711 and the second decoder 714 may be performed in parallel. This is possible as there are no inter-block dependencies.

In the decoding process, the decoder may parse the headers 704 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 750. The decoded video 750 may be a lossy or lossless reconstruction of the original input video 100 depending on the configuration of the low complexity encoder and decoder. In many cases, the decoded video 750 may be a lossy reconstruction of the original input video 600 where the losses have a reduced or minimal effect on the perception of the decoded video 750.

In each of FIGS. 6 and 7, the level 2 and level 1 encoding operations may include the steps of transformation, quantization and entropy encoding (e.g., in that order). These steps may be implemented in a similar manner to the operations shown in FIGS. 4 and 5. The encoding operations may also include residual ranking, weighting and filtering. Similarly, at the decoding stage, the residuals may be passed through an entropy decoder, a de-quantizer and an inverse transform module (e.g., in that order). Any suitable encoding and corresponding decoding operation may be used. Preferably however, the level 2 and level 1 encoding steps may be performed in software (e.g., as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847 or PCT/GB2017/052632, which are incorporated herein by reference. The encoder may select between different transforms to be used, for example between a size of kernel to be applied.

The transform may transform the residual information to four surfaces. For example, the transform may produce the following components or transformed coefficients: average, vertical, horizontal and diagonal. A particular surface may comprise all the values for a particular component, e.g. a first surface may comprise all the average values, a second all the vertical values and so on. As alluded to earlier in this disclosure, these components that are output by the transform may be taken in such embodiments as the coefficients to be quantized in accordance with the described methods. A quantization scheme may be useful to create the residual signals into quanta, so that certain variables can assume only certain discrete magnitudes. Entropy encoding in this example may comprise run length encoding (RLE), then processing the encoded output is processed using a Huffman encoder. In certain cases, only one of these schemes may be used when entropy encoding is desirable.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms. Hierarchically encoding a frame includes generating residuals for the full frame, and then a decimated frame and so on.

As indicated above, the processes may be applied in parallel to coding units or blocks of a colour component of a frame as there are no inter-block dependencies. The encoding of each colour component within a set of colour components may also be performed in parallel (e.g., such that the operations are duplicated according to (number of frames)*(number of colour components)*(number of coding units per frame)). It should also be noted that different colour components may have a different number of coding units per frame, e.g. a luma (e.g., Y) component may be processed at a higher resolution than a set of chroma (e.g., U or V) components as human vision may detect lightness changes more than colour changes.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where down-sampling reduces the dimensionality in each direction by 2). In this case, when traffic occurs the display device may revert to displaying the base reconstruction while the level 2 stream is disrupted (e.g., while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 720 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder. In the examples described herein residuals are encoded by an encoding pipeline. This may include transformation, quantization and entropy encoding operations. It may also include residual ranking, weighting and filtering. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g., high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g., symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g., in space and/or in time). They have characteristics that differ from the characteristics of the image data they are derived from (e.g., pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g., transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g., 2×2 or 4×4 kernels—the Directional Decomposition and the Directional Decomposition Squared—as presented herein). The transform described herein may be applied using a Hadamard matrix (e.g., a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated transformed coefficients (e.g., in space) that may be efficiently compressed. While correlations between transformed coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use.

Examples Relating to Remote Analysis of
Multi-Layer Signals

Figure 8:
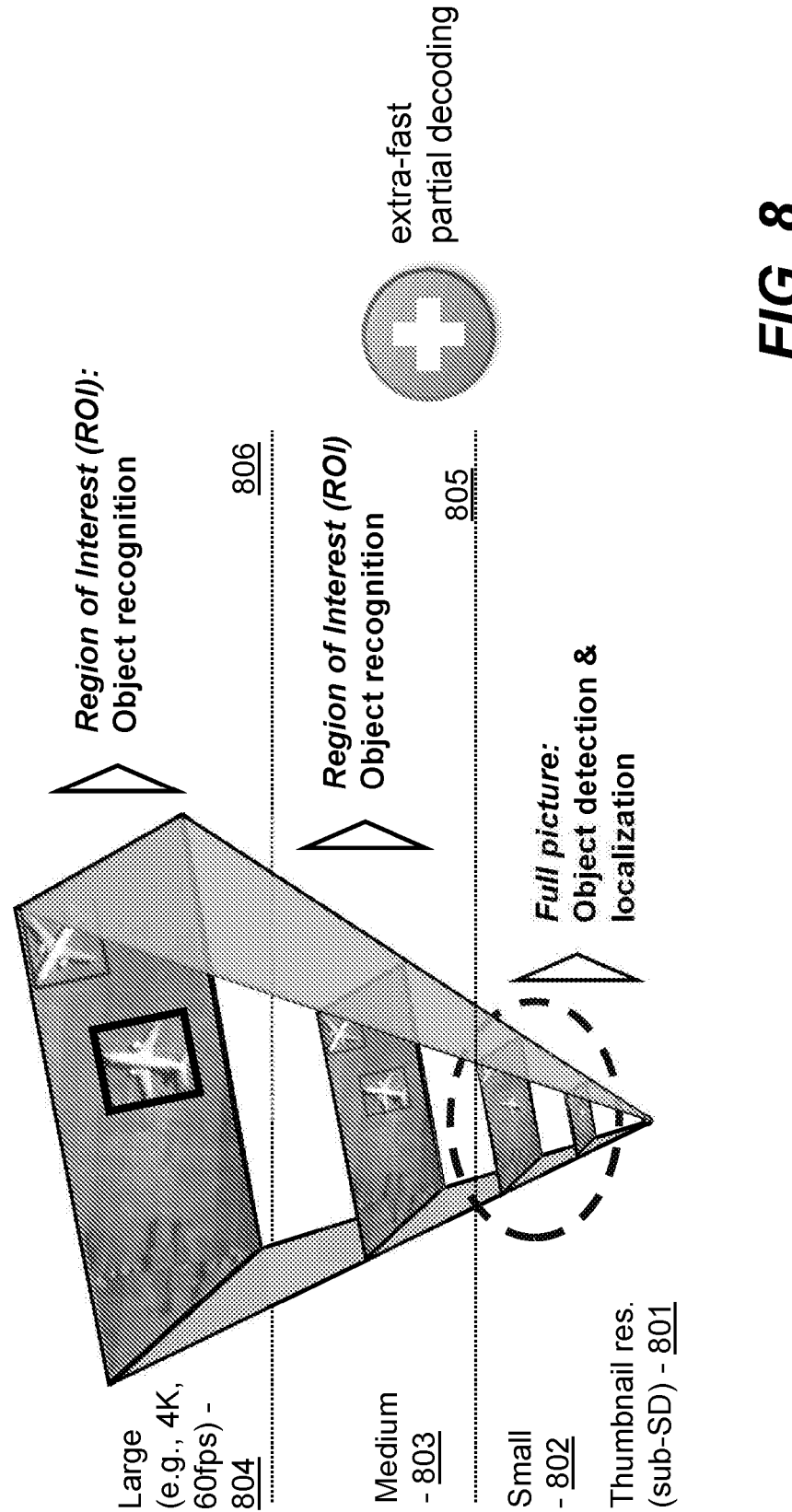
FIG. 8 shows a high-level schematic of a multi-layer coding format.

FIG. 8 shows a set of reconstructions at different levels of quality. In this example, the different levels of quality correspond to different spatial resolutions. Four layers are shown in FIG. 8: a sub-standard definition or thumbnail resolution layer 801; a small resolution layer 802; a medium resolution layer 803; and a large resolution layer 804. Reconstructions for the large resolution layer 804 may comprise a full frame of data at a highest resolution (e.g. UHD) and at a highest frame rate (60 frames per second). Reconstructions for the medium resolution layer 803 may be at a lower resolution, such as High Definition (HD). They may also have a lower framerate, such as 30 frames per second. Reconstructions at the small layer 802 may be at a Standard Definition (SD) resolution and at the same or a lower framerate as the medium layer 803. Reconstructions for the lowest layer 801 may be at a sub-HD level, e.g. nHD or VGA-style resolutions and again at the same or at a lower framerate than the small layer 802. It should be noted that these resolutions are provided as an example only and different implementations may have different tiers of resolutions depending on requirements.

The various tiers or layers of FIG. 8 may be generated by encoding and decoding a signal as described with reference to FIGS. 1 to 5 above. At a remote computing device, only encoded data relating to the thumbnail layer 801 or the thumbnail and small layers 801, 802 may be initially received from a set of cameras, decoded and used to reconstruct the representations below dotted line 805 in the Figure. The remote computing device may perform one or more video analysis functions on the reconstructions relating to the one or more lowest layers. The one or more video analysis functions may include object detection and localization as shown in FIG. 8.

In examples, if the one or more video analysis functions performed at the remote computing device indicate that a particular signal source is of interest, e.g. if an object is detected and/or localized in the initial reconstructions, a request may be made to an edge of a network where the signal is encoded to transmit encoded data associated with additional tiers or layers. For example, the remote computing device may request encoded data associated with the medium layer 803 so as to construct a reconstruction at a resolution of the medium layer. In the encoding examples described above, it may be seen that layers above the lowest layer may comprise residual data, such that the encoded data for the medium layer 803 only comprises encoded residual data at the medium resolution, which may be decoded and added to an upsampled or upscaled pre-existing reconstruction at the remote computing device. Hence, the encoded data for the medium layer 803 does not comprise a full signal stream at the medium layer resolution, and so may be efficiently transmitted and decoded.

In FIG. 8, a reconstruction based on further encoded data that is constructed at the medium layer 803 is used to identify one or more region of interests in the signal. This may be performed at the medium layer 803 or one or the lower layers. The region of interest may comprise an area around a detected object. In this example, the remote computer device may be configured to identify a region of interest in the reconstruction at the medium layer 803, and to use this to conditionally make a further request for encoded data relating to the regional of interest at a higher layer (e.g. the large layer 804). Coding formats such as VC-6 allow partial decoding for just a region of interest, and only encoded data for the region of interest may be transmitted from an encoding site.

Figure 9:
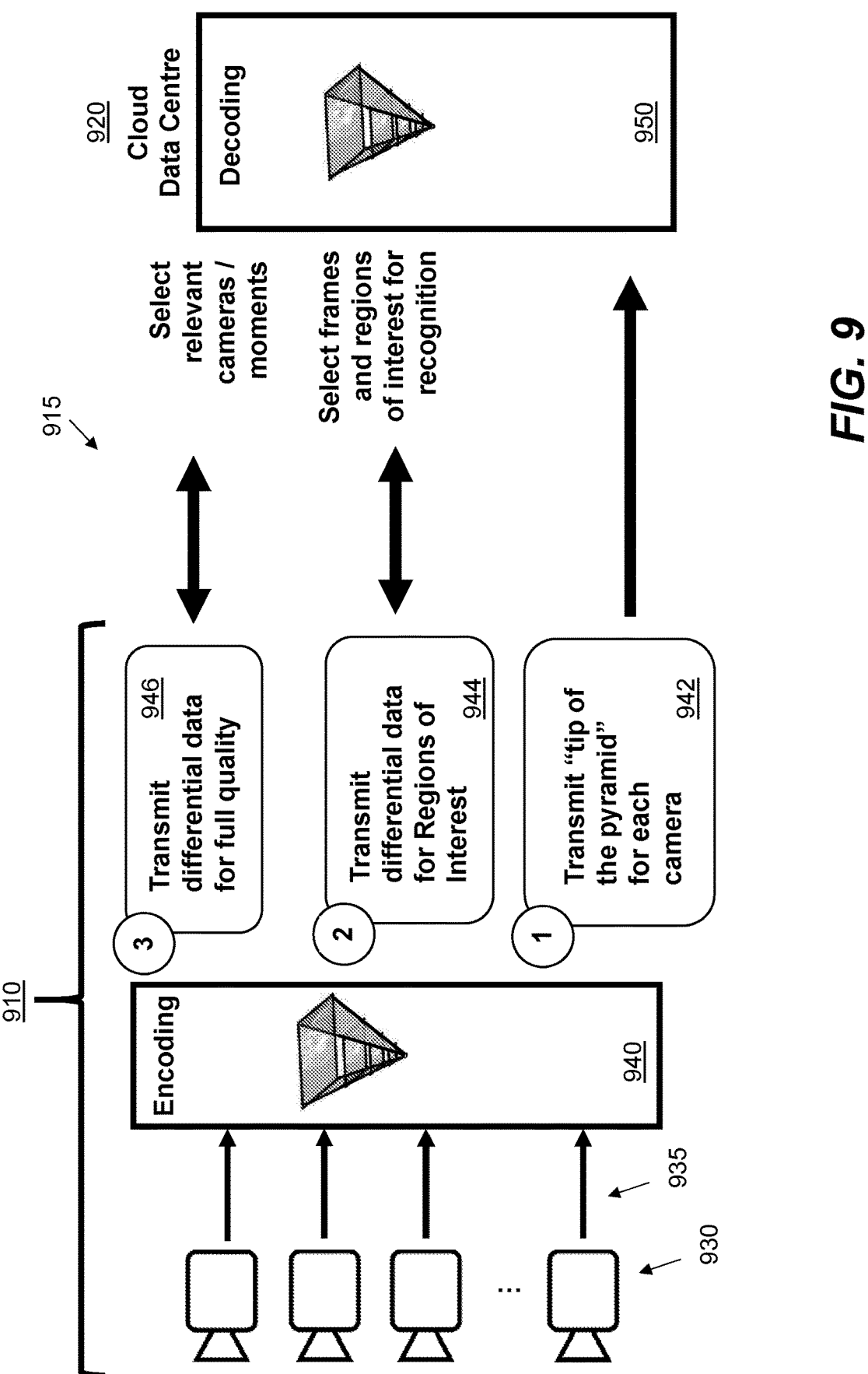
FIG. 9 shows a high-level schematic of a first example process for remote analysis of a locally captured signal.

FIG. 9 shows an example of distributed signal processing over two locations. A first location 910 may be referred to as an "edge" location, as this is closest to a set of signal sources. A second location 920 is remote from the first location 910, e.g. communicatively coupled to the first location 910 via one or more data communications networks 915. The second location 920 may be referred to as a "remote" location. In FIG. 9, the second location 920 comprises a cloud data centre. In other examples, the second location 920 may comprise any other site of video analysis functions. Typically, the bandwidth of data communications over the data communications networks 915 is more constrained than the bandwidth of data communications at each of the first and second locations 910, 920; for example, the data communications networks 915 may comprise the Internet or the like.

The first location 910 comprises a set of signal sources. In this example, these comprise a set of video cameras 930 that provide a plurality of video camera feeds 935. In other examples, the signal sources may comprise, amongst others, microphones, sensors etc. The first location 910 may, for example, comprise a sports stadium and/or an arts (music, theatre or film) venue. The first location 910 also comprises an encoding platform 940. This may comprise one or more computing devices (or dedicated hardware encoders) that are communicatively coupled to the plurality of video camera feeds 935. The streams from the set of signal sources may comprise raw and/or uncompressed signals at a high resolution, e.g. multiple UHDp60 streams over wired couplings. The encoding platform 940 is configured to generate encoded data streams for each of a plurality of layers within a layer-based encoding, wherein different layers in the plurality of layers correspond to different levels of quality (e.g. different spatial resolutions), where higher layers represent higher levels of quality. For example, in the context of FIGS. 1 to 5, the lower layers may comprise lower echelons below the $0^{th}$ echelon, with a lowest layer being the $R_{1-n}$ layer. These layers also correspond to the layers shown in FIG. 8. If a standard such as VC-6 is used for the encoding at the encoding platform 940, each video feed is encoded as a VC-6 data stream.

In a comparative example, following encoding at the encoding platform 940, encoded data streams are transmitted to another location for decoding. In the other location wishes to reconstruct a full quality signal stream, then encoded data for each layer is transmitted across to the other location and the signal is reconstructed by decoding the encoded data for each layer (e.g. as described in FIGS. 5 and 7).

However, in the present examples, there may not be suitable network or processing bandwidth to transmit the full set of encoded data streams for all layers to the second location. Additionally, even if suitable bandwidth is available, the video analysis functions may not be able to simultaneously process (e.g., in real-time) signals for all of the plurality of signal sources.

Hence, in the present examples, only encoded data streams for one or more lowest layers for the plurality of signal sources are transmitted from the first location 910 to the second location 920. For example, at least an encoded data stream for the lowest layer in a hierarchy may be transmitted to the second location 920 for receipt and decoding by decoding platform 950. Due to the multi-layer encoding (e.g., as described above) this is possible without adapting the encoding or decoding process—the first location simply transmits the encoded data stream for the desired lower layers and does not (at least initially) transmit the encoded data streams for higher layers (e.g., layers associated with higher levels of quality).

In FIG. 9, as shown by block 942, initially only the "tip" of each multi-layer pyramid is transmitted for the set of video cameras 930. This may comprise only transmitted encoded data for the thumbnail resolution layer 810. In other cases, it may comprise transmitting a defined number of lowest layers, such as both the thumbnail resolution layer 801 and the small layer 802 (e.g. the layers below line 805). The number of lowest layers that are selected may depend on a static user-defined parameter and/or dynamic parameters such as available bandwidth over the data communications networks 915 and/or processing resources at the second location 930. In this case, the processing resources may relate to one or more processors performing one or more video analysis functions on the output from the decoding platform 950. The decoding platform 950 generally implements a decoding process that corresponds to the encoding process of the encoding platform 940. For example, the decoding platform 950 may implement the VC-6 decoding process.

In the present example, the encoded data for the lowest layers transmitted via block 942 is decoded by the decoding platform 950 to generate a set of reconstructions of the plurality of video camera feeds at a first level of quality. For example, this may comprise generating a reconstruction such as 520 in FIG. 5 for each video camera feed. At the second location one or more video analysis functions are applied to the reconstructions. As described above, these may comprise scene analysis, face detection, pose detection, object detection etc. The video analysis functions may be based on AI or neural network approaches.

In the example of FIG. 9, an output of the one or more video analysis functions is an identification of one or more portions of the reconstructions for further analysis. This may comprise identification of one or more encoded data streams, i.e. identification of one or more specific video camera feeds. It may also, or alternatively, comprise identification of one of more frames (e.g. images in time) and/or one or more regions of interest (e.g. as defined by a spatial area within a frame and/or a particular set of pixels and/or coding units for a frame). This identification may be performed at the second location 920 (e.g., by a remote processing device operating on the output of the decoding platform 950). The second location 920 may thus request different data for the identified video camera feeds, frames and/or regions of interest. This is shown by the two-way arrow and block 944 in FIG. 9.

On receipt of a request identifying video camera feeds, frames and/or regions of interest, the encoding platform 940 (or a device at the first location 910 that is coupled to the encoding platform 940) transmits additional or further encoded data that corresponds to the identified video camera feeds, frames and/or regions of interest. This may comprise performing a partial file recall operation from the encoding platform 940 (or coupled device) in the first location 910. For example, only encoded data to obtain the residual data 526 in FIG. 5 may be required and this may be combined with an upsampled version of a lower layer reconstruction (e.g. 524 from 520 in FIG. 5). This encoded data may be efficiently communicated using less bandwidth than a full video feed at the same layer quality (e.g. resolution). For example, the encoding platform 940 may transmit data for the medium layer 803. In one case, the encoding platform 940 may only transmit encoded residual data for a subset of locations within a frame, e.g. only transmit residual data for pixels and/or coding units that fall within an identified region of interest. Coding schemes such as VC-6 allow for efficient decoding of partial portions of a video frame, e.g. due to the unique S-tree coding structure. For example, S-trees combined with an arithmetically simple transform, such as the Hadamard transform described above, allow the use of Same Instructions with Multiple Data (SIMD) computing elements, and so the encoding and/or decoding is particularly suited to modern hardware which has SIMD and vector units, such as Graphical Processing Units (GPUs) and Field Programmable Gate Arrays (FPGAs). Additionally, the multi-10 layer coding describes herein does not require the application specific acceleration that is often required for comparative JPEG/MPEG codecs. Decoding is also faster than for comparative residual data coding schemes that operate on the whole frame of data. In one case, the further encoded data may relate to a subset of a set of components (e.g. only one colour component such as Y or one main/centre audio channel).

The second location 950 thus receives further encoded data for the identified signal sources, frames and/or regions of interest, e.g. associated with a higher level of quality that the previously received encoded data. This further encoded data is then decoded by the decoding platform 950 to generate a second set of reconstructions. These for example may comprise the reconstructions shown as 528 in FIG. 5 (or a portion of these reconstructions). The second location 920 is then able to instruct one or more video analysis functions on the data from the second set of reconstructions, which may comprise further analysis at a higher spatial resolution on at least a region of interest, e.g. an analysis at the medium layer 803 of FIG. 8.

This process of incremental analysis may continue for as many layers as there are in the encoding or until a metric from the video analysis function exceeds a predefined threshold. For example, encoded data associated with increasing levels of quality may be iteratively requested, transmitted, decoded and analysed until an accuracy threshold is exceeded and/or until a highest level of quality is reached. Although examples are explained with respect to ascending from lowest levels of quality, those skilled in the art would understand similar approaches may be applied for any two layers in the multi-layer encoding, where a first layer is at a lower level of quality than a second layer.

In FIG. 9, requests for differential or residual data for a full quality reconstruction (e.g. all the layers in the hierarchy) as shown in block 946 may be made for a subset of the video camera feeds, e.g. for one or more of the signal sources that are relevant to current video analysis. This selection of the subset of the video camera feeds may be made on the analysis performed as part of the previous blocks (e.g. 942 and 944). For example, a full quality reconstruction may be desired for video cameras that are currently capturing action from a live event, such as a location of a soccer ball, a lead singer in a band and/or actor on stage. Encoded data streams for video camera feeds that currently are not useful for video analysis (e.g. because they are empty of people and/or action) need not be transmitted to the second location 920. The whole process may be dynamically applied during a live event, such that the video cameras that are selected as part of block 946 may constantly change during the course of the event.

Figure 13A:
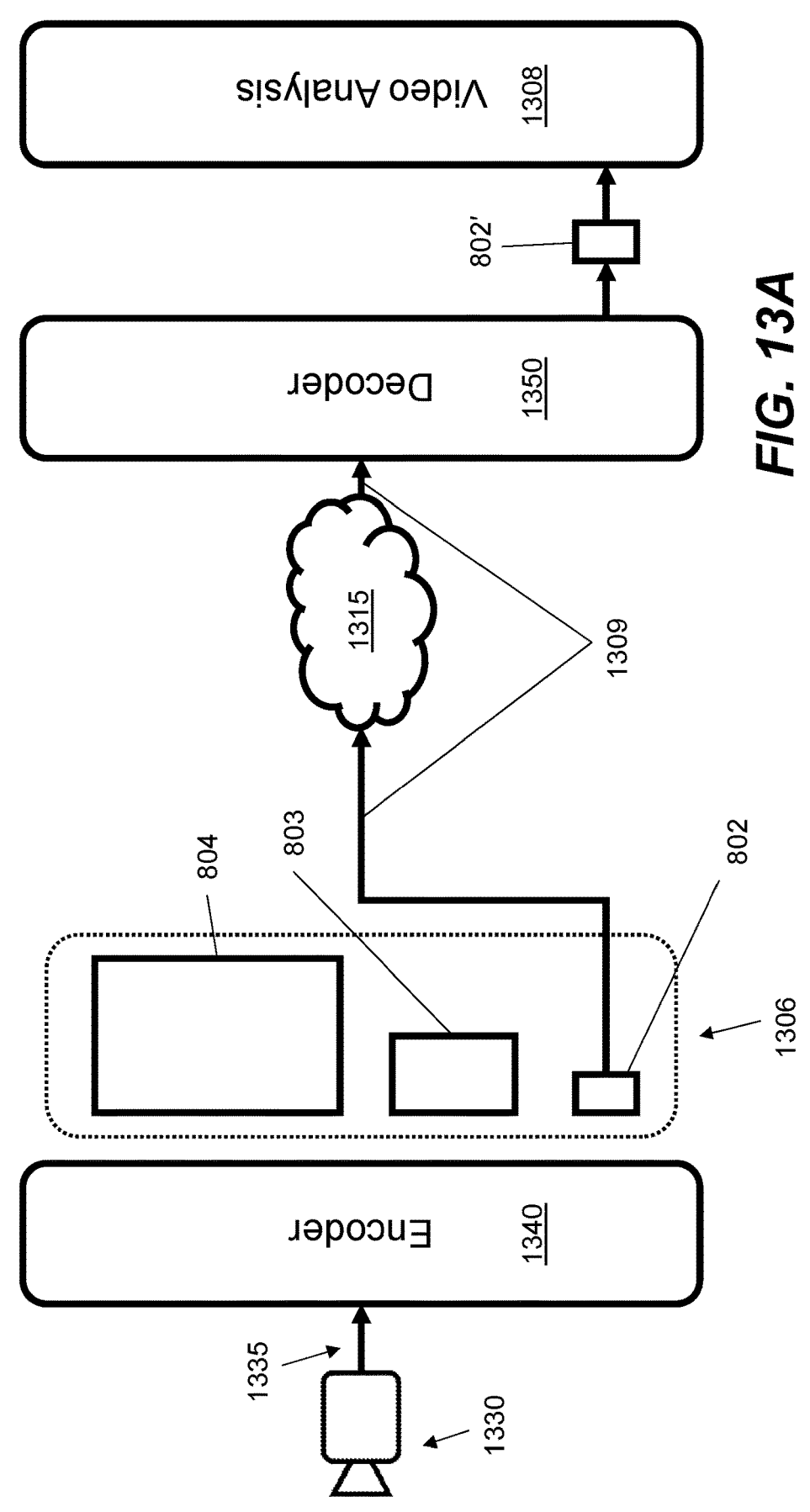
FIGS. 13A to 13D show an example process of a tiered transmission of video data for one example camera.

The process of incremental data exchange and analysis is shown for one signal source in FIGS. 13A to 13D. FIG. 13A illustrates a signal source 1330, a signal stream 1335 (e.g. at full quality), an encoder 1340, a communications network 1315, decoder 1350 and video analysis module 1308. The encoder 1340 receives the signal stream 1335. The signal stream 1335 is then encoded to form encoded small layer 802, encoded medium layer 803 and encoded large layer 804. It is also shown that the encoded small layer 802 is sent (1309) to decoder 1350 (e.g. at a remote location) via communications network 1315. The lines 1309 indicate that the encoded small layer is sent to the decoder. The decoder 1350 decodes the encoded small layer 802 to produce a decoded small layer 802', which is transmitted to video analysis module 1308. The decoded small layer 802' may also be subject to some amount of distortion, which may be governed by a quantization of the signal stream 1335 performed in the encoder 1340. Video analysis module 1308 performs video analysis on the decoded small layer 802'. In some scenarios, the video analysis module 1308 may perform analysis on the encoded small layer 802 (i.e. in addition to or as an alternative to the analysis on decoded small layer 802'). The video analysis module 1308 may be able to determine certain attributes of the encoded information. In this scenario, the encoded small layer 802 and the decoded small layer 802' may both be sent to the video analysis module 1308, but the encoded small layer 802 is not passed through the decoder 1350.

Figure 13B:
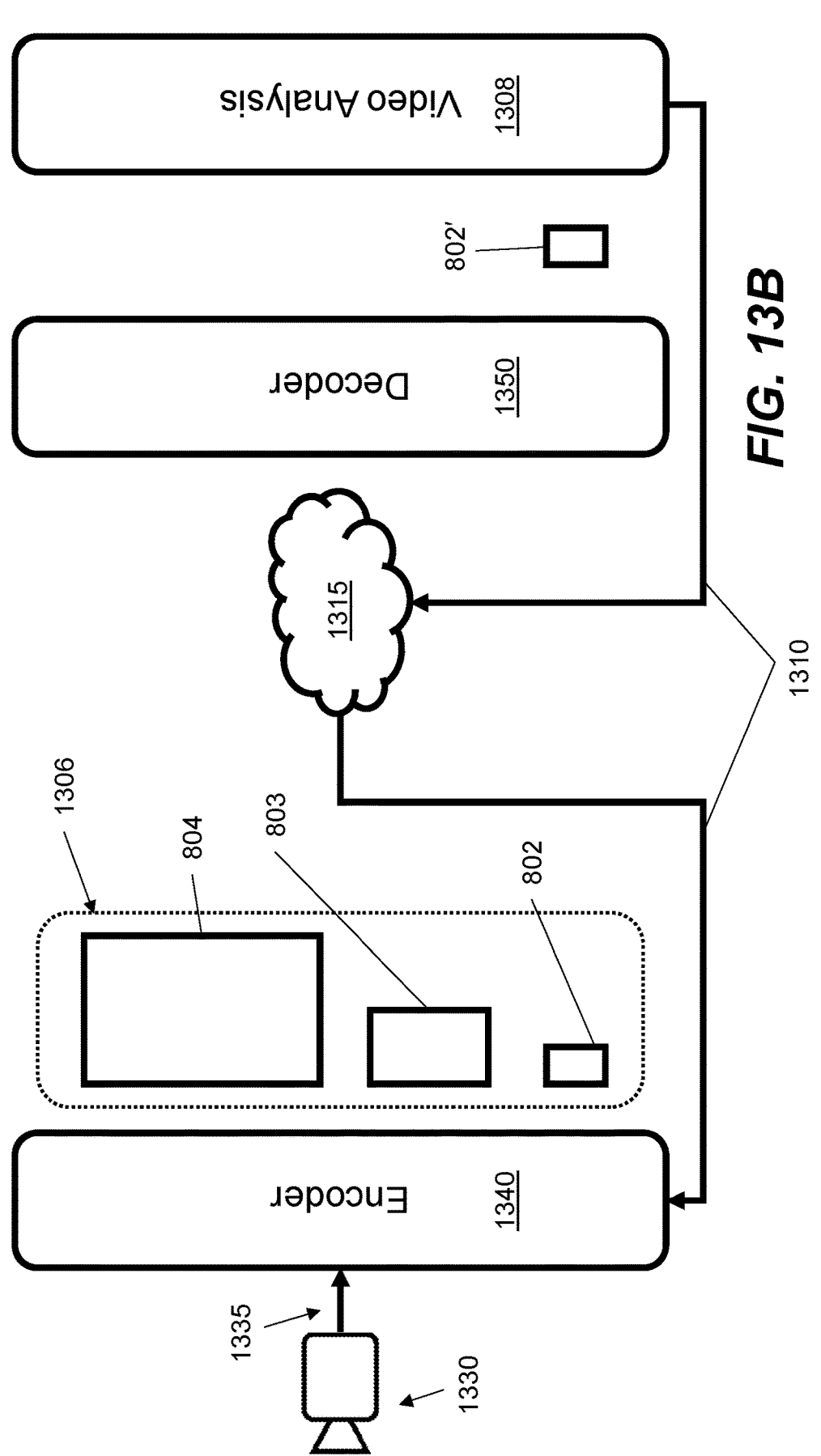

As shown in FIG. 13B, once the decoded small layer 802' is received by the video analysis module 1308, the video analysis module sends a request 1310 to the encoder 1340, via the communications network 1315, for another layer of the encoded signal stream 1335 to be transmitted from the encoder 1340 to the decoder 1350. The request 1310 may be sent after the decoded small layer 802' is analysed. In particular, the request 1310 may be sent in response to an outcome of the analysis of the decoded small layer 802'. For example, in response to an analysis of the decoded small layer 802', the video analysis module 1308 may determine that it would be advantageous to perform analysis on another layer (e.g. medium decoded layer 803'), in such an example, the video analysis module 1308 sends the request 1310 to the encoder 1340 for another layer of the encoded signal stream 1335 (e.g. medium encoded layer 803) to be transmitted from the encoder 1340 to the decoder 1350.

Figure 13C:
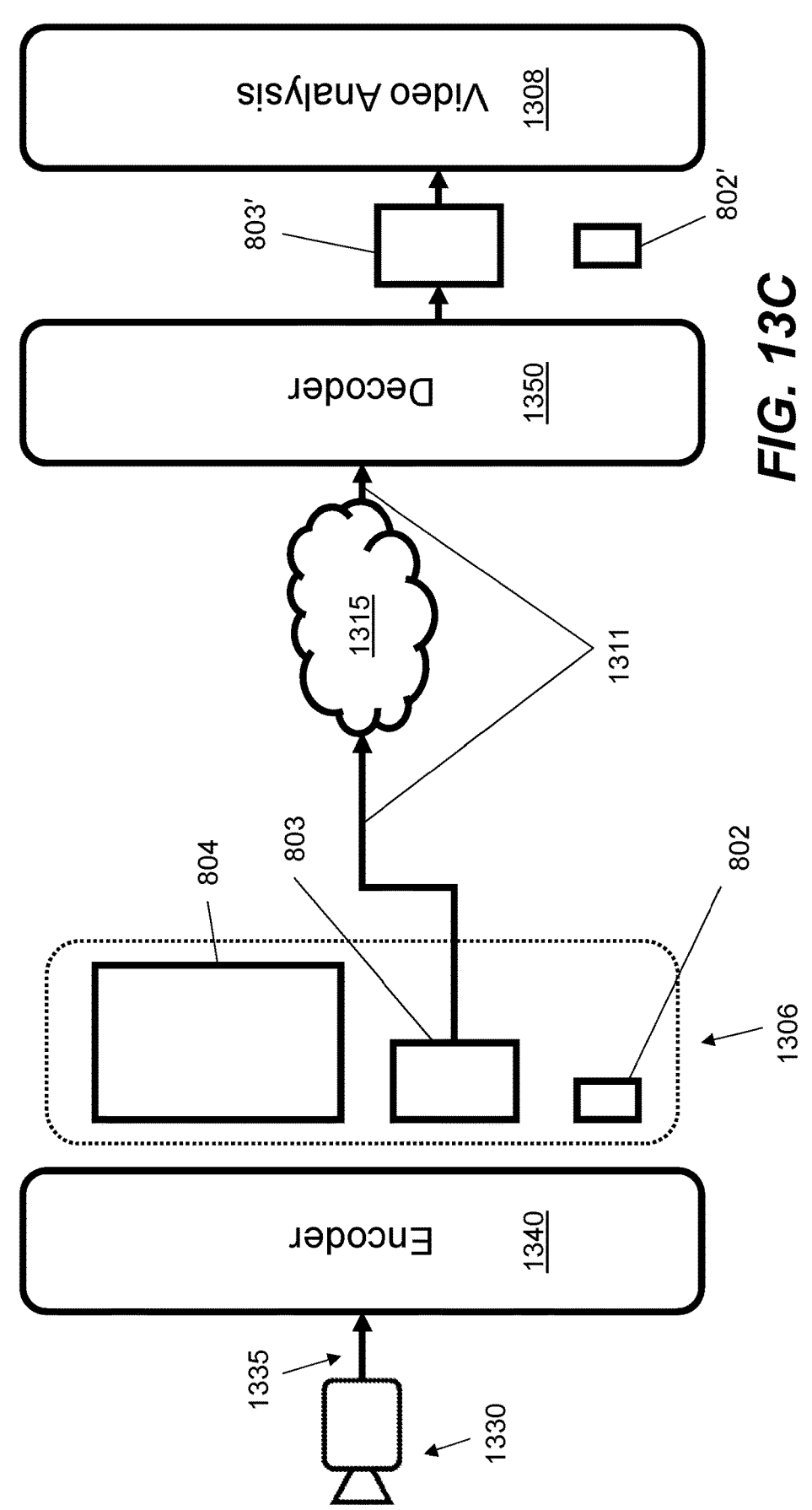

As shown in FIG. 13C, after the encoder 1340 receives the request 1310 (as illustrated in FIG. 13B), the encoded medium layer 803 is sent (1311) to the decoder 1350 via communications network 1315 (as illustrated in FIG. 13C). The lines 1311 indicate that the encoded medium layer 803 is sent to the decoder. The decoder 1350 decodes the encoded medium layer 803 to generate decoded medium layer 803' The decoded medium layer 803' is sent from the decoder 1350 to the video analysis module 1308. It is also possible that the small layer of the next frame is the signal stream 1335 travels through the encoder and decoder in parallel with the encoded medium layer 803, but this is not shown.

Figure 13D:
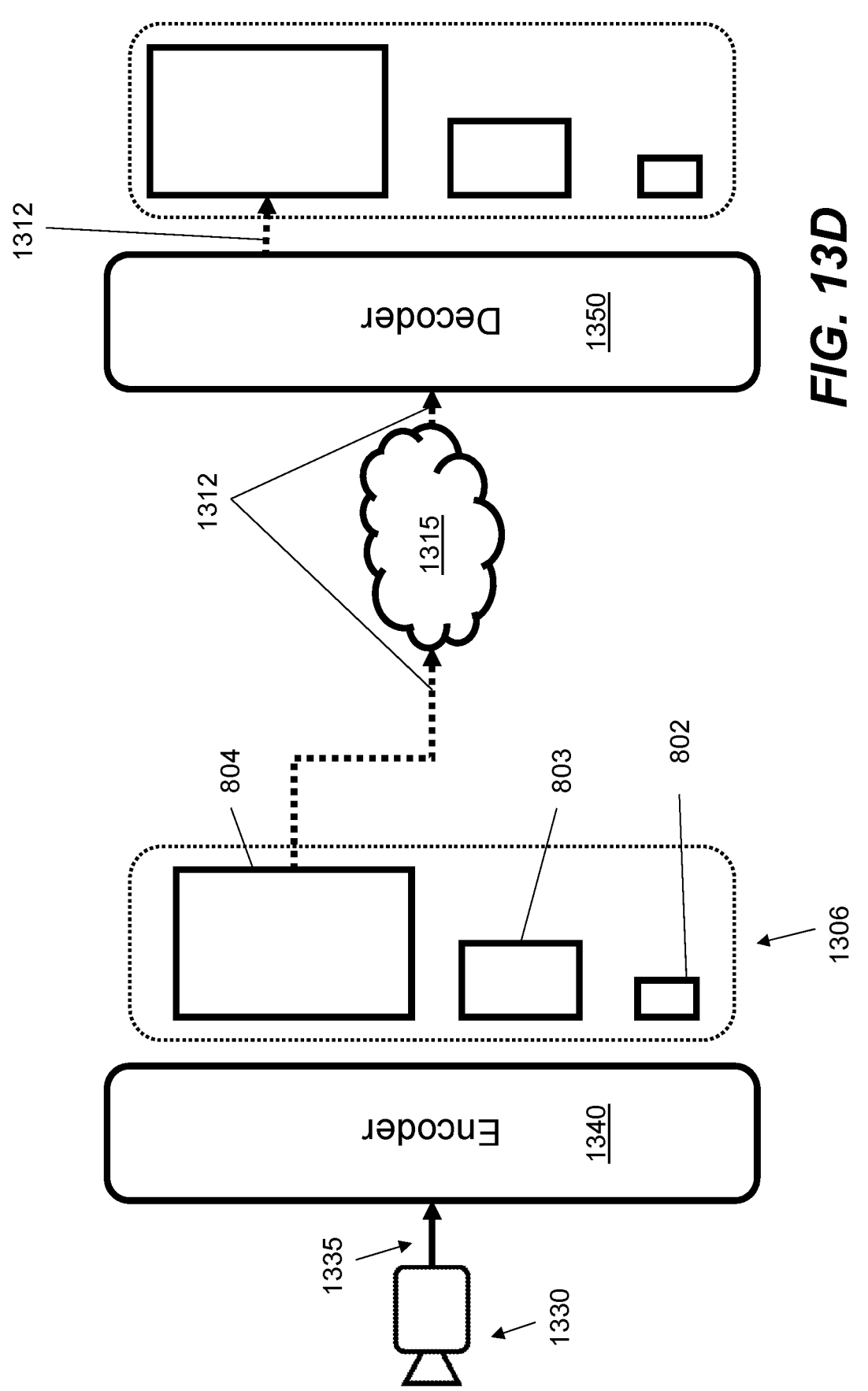

As illustrated in FIG. 13D the encoder 1340 sends the encoded large layer 804 to the decoder 1350 via the communications network 1315. The dotted lines 1312 indicate that the encoded large layer 804 is not always sent to the decoder. The benefits of not always sending the encoded large layer 804 are explained below.

The methods and systems described herein may be applied for one signal source or for multiple signal sources. The configuration of FIG. 9 may be considered as an AI-assisted Transmission Funnel that allows a cloud-based AI analysis of on-premises data. In this example, full quality signal streams for all signal sources may be available at the edge locations and may be obtained in stages by a second AI analysis location. As shown in FIG. 13D, for signal sources where encoded data for the full set of layers is not transmitted, this may be transmitted later (e.g. in a non-real-time setting) for archival purposes. For example, this may be performed overnight for additional encoded data from a live event such that the full quality video camera feeds are available at the second location 920 after the live event (e.g. to be archived and/or used/edited for distribution). In this manner, for video feeds, enhanced AI-based delivery of video data may be performed and all the video data may be available remotely without requiring excess bandwidth both during a live event and after the live event. In certain cases described herein, an archive may be stored below full-quality or resolution, e.g. at the medium layer 803 or at an HD rather than UHD level of quality. In this case, the operations of FIG. 13D may not be performed, and only a mid-level layer of encoded data may need to be transmitted to the remote location for the video camera feeds.

Figure 10:
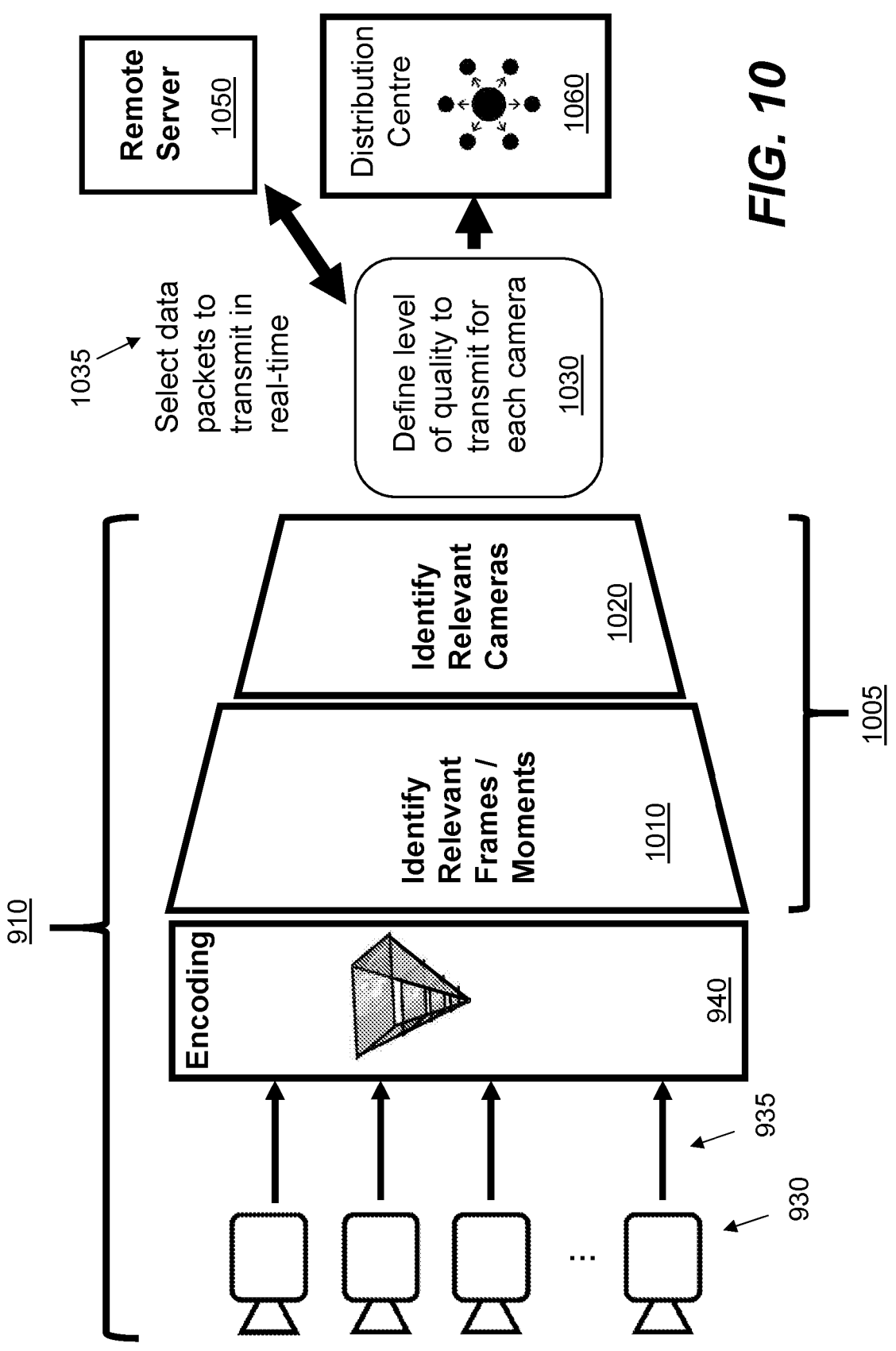
FIG. 10 shows a high-level schematic of a second example process for remote analysis of a locally captured signal.

FIG. 10 shows another example of a distributed signal processing system. This may be seen as an alternative variation of the example of FIG. 9. FIG. 10 is an example of a hybrid approach whereby identification of encoded data streams is performed at the first location 910 rather than at the second location. Hence, the present approaches provide flexibility as to where particular processing of a set of encoded signals is performed.

FIG. 10 shows a set of signal sources 930, a set of signal streams 935 (e.g. at full quality) and an encoding platform 940 as set out in FIG. 9. In this example, there are two additional processing operations performed on the output of the encoding platform 940. These additional processing operations are performed by a preprocessing computing device 1005. A first operation comprises frame identification 1010 and a second operation comprises camera identification 1020. Although shown in one order in FIG. 10, these operations may also be performed with operation 1020 to 1010 in other implementations. Although preprocessing computing device 1005 is shown at the first location 910, it may alternatively be at a remote location (e.g. the second location of FIG. 9) or at an intermediate location. The frame identification 1010 and the camera identification 1020 may operate to determine a particular upper level of quality for each signal source 930. This may be performed using a similar process to that shown in FIG. 9. Alternatively, if the frame identification 1010 and the camera identification 1020 operations are performed on a computing device at the first location 910, they may have access to the full stack of layers, e.g. all or a majority of the encoded signal streams. For example, the set of signal sources may be assigned a priority class. Low priority signal sources, as identified by frame identification 1010 and camera identification 1020, may be associated with one or more lowest layers in the multi-layer format (e.g. the thumbnail and/or small resolution layers 801 and 802 in FIG. 8); high priority signal sources, as identified by frame identification 1010 and camera identification 1020, may be associated with a full or near full set of layers in the multi-layer format. At block 1030 in FIG. 10, the output of the frame identification 1010 and camera identification 1020, which may be an assigned priority class to each video camera feed, is used to define a set of levels of quality to transmit for each signal source 930.

Figure 11:
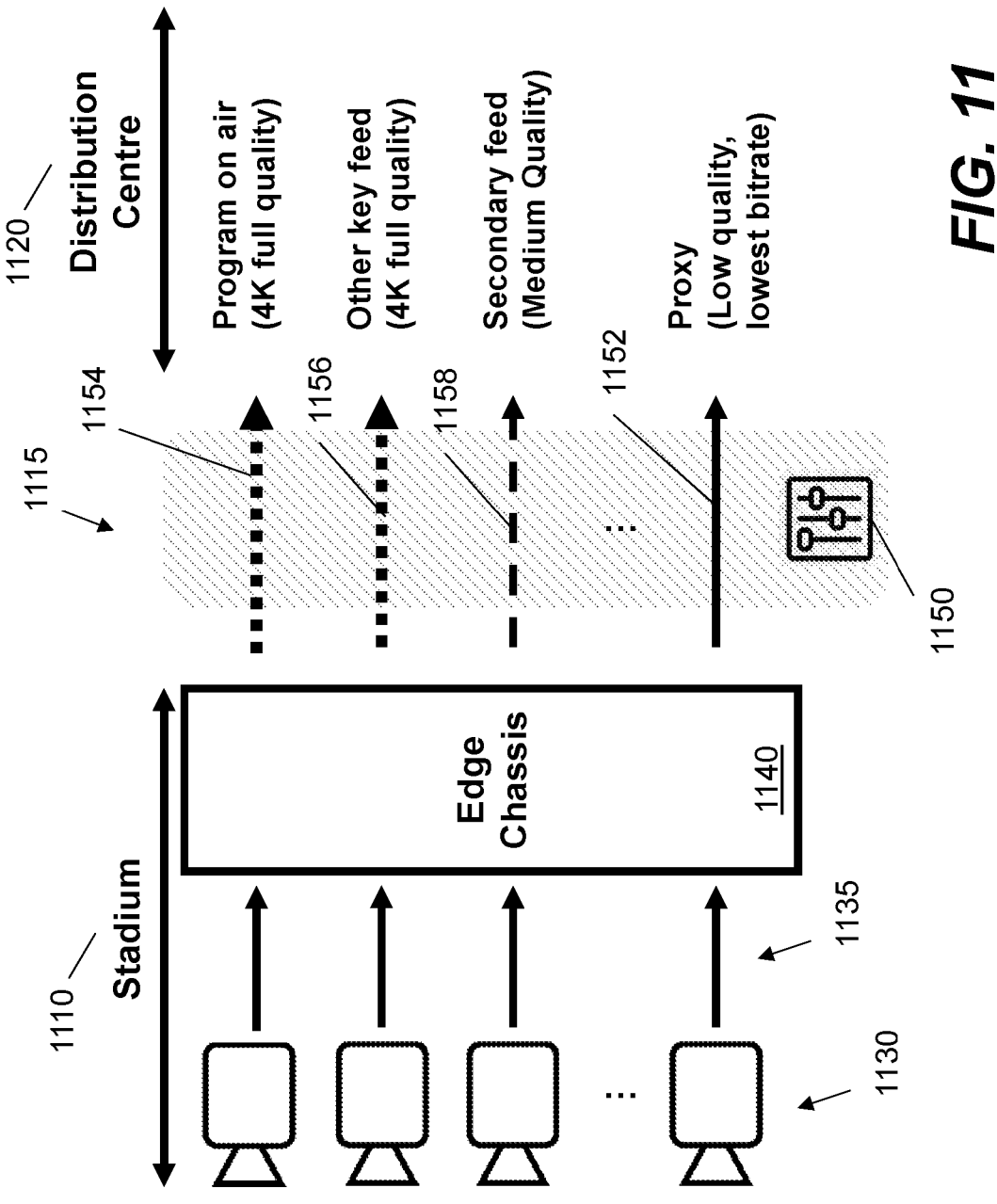
FIG. 11 shows a high-level schematic of a second example process for remote analysis of a locally captured signal.
Figure 12:
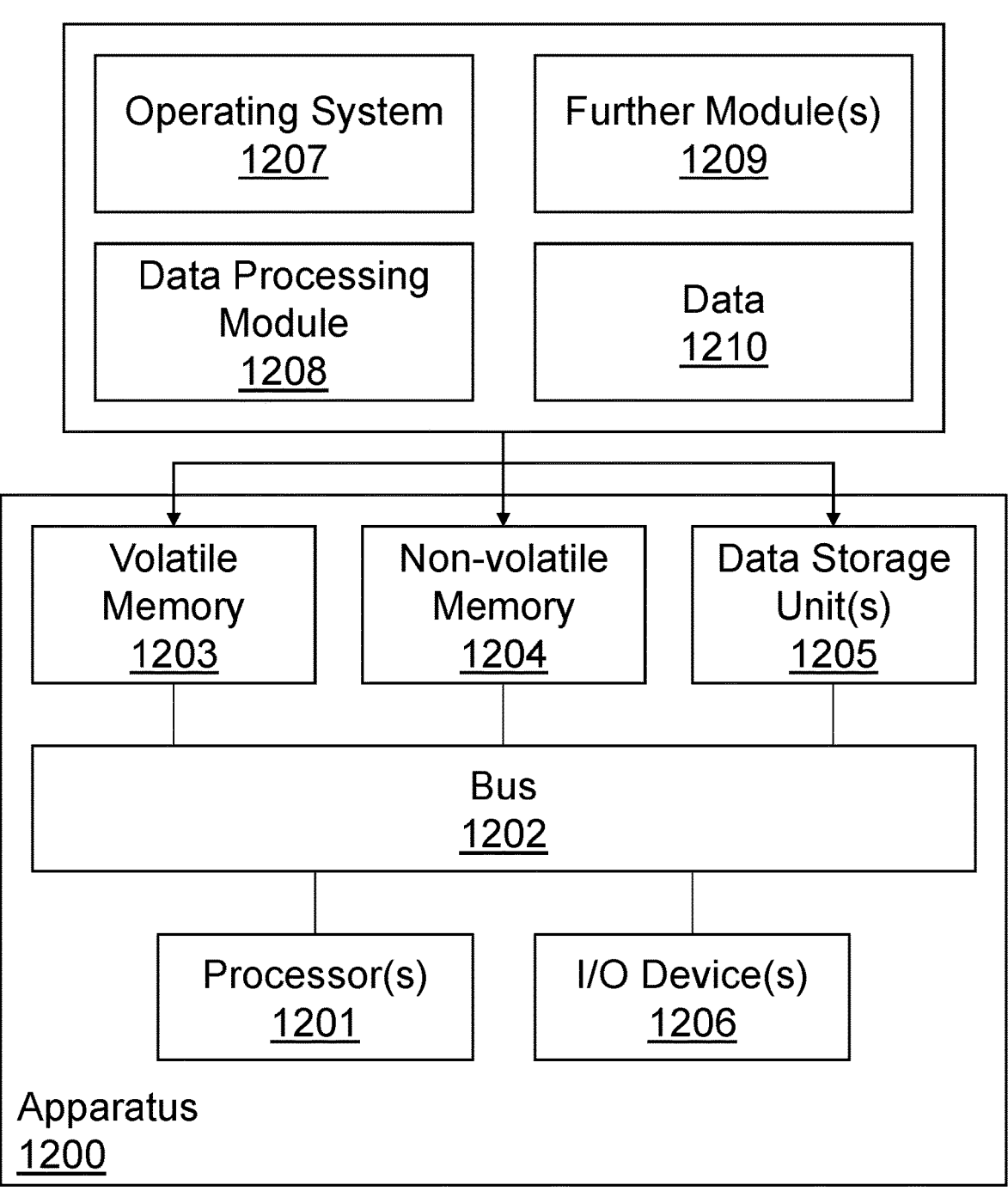
FIG. 12 shows an example apparatus for implementing examples described herein.

In the example of FIG. 10, the edge location 910 communicates with both a remote server 1050 and a distribution centre 1060. The remote server 105 may perform remote decoding and video analysis as described with reference to FIGS. 9 and 13A to 13D. As shown by communications 1035, the remote server 1050 may provide remote video analysis in order to assign the priority classes or otherwise indicate the data packets of the encoded data streams that are to be transmitted to the distribution centre 1060 (e.g. for real-time distribution of video and/or audio relating to a live event). As such, the distribution centre 1060 may receive AI-selected video feeds at a full level of quality for a subset of the signal sources, where the encoded data that is sent to the distribution centre 1060, and the signal sources that are selected for primary (live) distribution vary during a live event based on automated video analysis. this may allow, for example, automated football or actor tracking, automated full-face tracking, automated action tracking, automated close-caption camera review etc. The distribution centre 1060 may distribute encoded data to one or more end user devices for rendering of a decoded signal, e.g. viewing a video feed. FIG. 11 is a further example of how the methods and systems described herein may be applied in the context of a live sporting event. The configuration shown in FIG. 11 is similar to that shown in FIGS. 9 and 10. A stadium 1110 is located at a first location and a distribution centre 1120 is located at a different, remote location. A plurality of video cameras 1130 are arranged around the stadium 1110 to capture the sporting event from different locations, angles, and positions. The video cameras 1130 provide a set of full quality video streams to at edge chassis 1140. The edge chassis 1140 comprises a computing device to implement the encoding platform of the previous examples. The computing device may be configured as shown in FIG. 12 and may comprise a server computing device.

The stadium 1110 and the distribution centre 1120 are communicatively coupled by an intelligent interconnect 1115, which may be implemented using one or more of the cloud data centre 920 of FIG. 9, the remote server 1050 of FIG. 10 and a set of data communications networks. A server computing device may form part of an intelligent mixer 1150 for controlling the encoded video streams that are sent to the distribution centre 1120 for real-time distribution.

In this example, all video streams are encoded (e.g. compressed) at the stadium 1110, which forms a first (edge) location. The edge chassis 1140 may implement an encoding platform that encodes the set of video streams 1135 using a multi-layer encoding such as VC-6. The set of video streams 1135 may be encoded at a maximum intra-only quality.

In real time (i.e such that frames can be appropriately rendered and viewed at an end device with minimal delay), encoded data for key cameras from the set of video cameras 1130 are transmitted at full quality, i.e. with all the layers in the encoding, and other cameras in the set of video cameras 1130 are sent using only lower layers of the encoding, e.g. using only lower resolution data such as that associated with one or more of the layers 801 and 802 in FIG. 8.

In FIG. 11, a proxy feed 1152 is received by the distribution centre 1120 (and any remote processing server device) that comprises encoded data for at least a lowest layer in the multi-layer encoding. This may comprise encoded data such that used to decode reconstruction 515 in FIG. 5 or the thumbnail resolution layer 801 in FIG. 8. The distribution centre 1120 also receives encoded data for all layers in the form of primary feed 1154; for example, this may comprise encoded data to reconstruct a full (e.g. 4K) quality signal that represents a currently distributed video feed (e.g., a currently selected camera for a football match that is being received by viewing devices). Other key feeds 1156 may also be sent to allow full quality reconstructions (e.g. alternative camera positions for a current set of action). The primary and key feeds 1154 and 1156 may be selected based on intelligent mixing by the intelligent mixer 1150. For example, a remote processing device may receive the proxy feed 1152 as described with reference to FIGS. 9 and 13A, and use this to select encoded data for one or more higher layers that are transmitted via a secondary feed 1158. The remote processing device may identify relevant moments (e.g. periods of time such as 30-50 minutes where action was taking place) and/or relevant cameras using the proxy and/or secondary feeds 1152 and 1158, and use this identification to instruct additional layers to be transmitted and received by the distribution centre 1120 to make up a full high-quality encoded stream.

In one case, if the remote processing device is located at the distribution centre 1120, then the both the remote processing device and the distribution centre 1120 may receive the same proxy feed 1152, and any secondary feed 1158 requested by the remote processing device may be accessible (e.g. passed to) the distribution centre 1120. In this case, if the remote processing device indicates a switch to another camera feed, and the proxy and secondary feeds 1152 and 1158 have already been received, all that is needed to receive the full quality feeds 1154 or 1156 is the residual data for the layers above the layer carried in the secondary feed 1158. This can allow for efficient and quick switching between feeds, as only a delta or differential set of layers for the feed is required. This allows real-time mixing and camera/frame switching. As shown in FIG. 13D, at the end of the event, the remaining data packets for higher layers that were not used as part of the distribution of the live event but that have been encoded and stored at the edge chassis

1140 may be then transmitted to the distribution centre 1120 (e.g. on a non-real-time basis) for archival.

In a specific implementation, at a video capture location, the signal sources 930 or 1130 may comprise a plurality of video cameras whose full quality video streams (i.e. the default output of the video cameras) are communicated to a server computing device at the first location 910 or 1110, where the encoding platform 940 or 1140 compresses all the received video feeds at a contribution standard. The compressed or encoded data may be saved locally to disk as a set of growing files. In the case of FIG. 10, on-location processing may be performed to index the encoded data; in the case of FIG. 11, this may be performed locally or remotely. Indexing may allow live video feeds to be selected and for levels of quality of each camera to be selected. Selection may be performed manually, e.g. by a user operating a local or remote mixing application or desk, and/or automatically by remote or local video analysis functions. In certain cases, encoded data associated with a lowest or very low resolution (e.g. 801 or 802 in FIG. 8) may be sent for automated indexing using advanced video analysis functions (e.g. AI applications). In certain cases, only one colour component, such as a Y or luma component, may be transmitted for remote analysis and/or a frame rate may be reduced (e.g., 1 in N frames may be transmitted, which can be multiplexed using time or frame division multiplexing). Encoded data that is not immediately transmitted may be stored locally as a set of files. This encoded data may be later transmitted, e.g. after a live event, and/or saved to a storage medium for physical transportation or local archival.

According to the examples described herein, the latency advantage that is found with comparative coding and analysis methods may be significantly reduced, e.g. video analysis functions may be performed remotely with little additional latency as compared to on-premises processing. Indexing of particular video camera feeds may be performed to select video camera feeds for distribution in the future, e.g. footage relating to replays and/or Video Assistant Referees (VAR). Video analysis functions may be used to identify particular video camera feeds for human review and/or preferred viewing. For example, video analysis functions may identify one or more portions of video (e.g. either particular frames in the stored encoded files and/or particular cameras) for review by human referees. Moreover, regions of interest may be identified (such as whether a soccer ball crossed a goal line) and encoded data for high quality reconstructions of these regions may be transmitted to remote locations more quickly than the complete frame.

Certain examples described herein may be applied as different modes during an event.

In a first event mode, the data communications link between the event location and a remote studio and/or data centre may be configured to prioritise human or AI selected video camera feeds (e.g. feeds 1154 and 1156 in FIG. 11) and requested random access echelons of encoded data or encoded data associated with regions of interest. As in FIG. 11, low resolution proxy feeds 1152 may be continuously transmitted for one or more cameras to allow remote analysis. Remaining spare capacity for the data communications link, such as the secondary feed 1158, may be used based on automated selection of encoded data for analysis at the remote location. This may be seen as a form of automated "gap-filling". It may be performed to prioritise echelons, planes, colour components and/or frames for transmission. The prioritised encoded data may be decoded at a later point to produce highlights of the event. This can thus efficiently transport the encoded data from the event location to a remote location during the event, such that at the remote location (e.g., a distribution centre 1120) encoded data for useful portions of video is more likely to be available. In one case, only echelons of encoded data that are needed to produce an HD viewable video may be transferred to produce further videos, such as news and highlights.

A second event mode may be associated with the start, end and/or middle of an event, such as half time or full time in a sporting match. In this mode, the compression ratios for the encoding may be higher (as outside, high-quality action feeds are not required) and the number of required feeds (i.e. active cameras) may be lower. For example, there may be just one or two cameras from an on-premises commentary box. In this second event mode, the data communications link may be significantly less populated and therefore the gap-filing described above may be increased, based on automated prioritisation as described herein.

Lastly, there may be a post event mode for when the event is finished. In this case, there may be no camera feed that is actively being distributed to viewers. In this case, all the bandwidth of the data communications link may be dedicated to the above "gap-filling" prioritisation. This may continue until all encoded data is received at the remote location (e.g., for archival as shown in FIG. 13D) and/or until a local set of computing devices are switched off.

In certain cases, the computing devices that are at the first location may be located within a mobile unit (such as a production truck) that is driven to the first location prior to the event. In this case, any encoded data that is not transmitted over the data communications link may be stored within a storage medium located within the mobile unit and the mobile unit may be physically driven to the remote location, where this mobile-unit-stored content may be uploaded.

Figure 14:
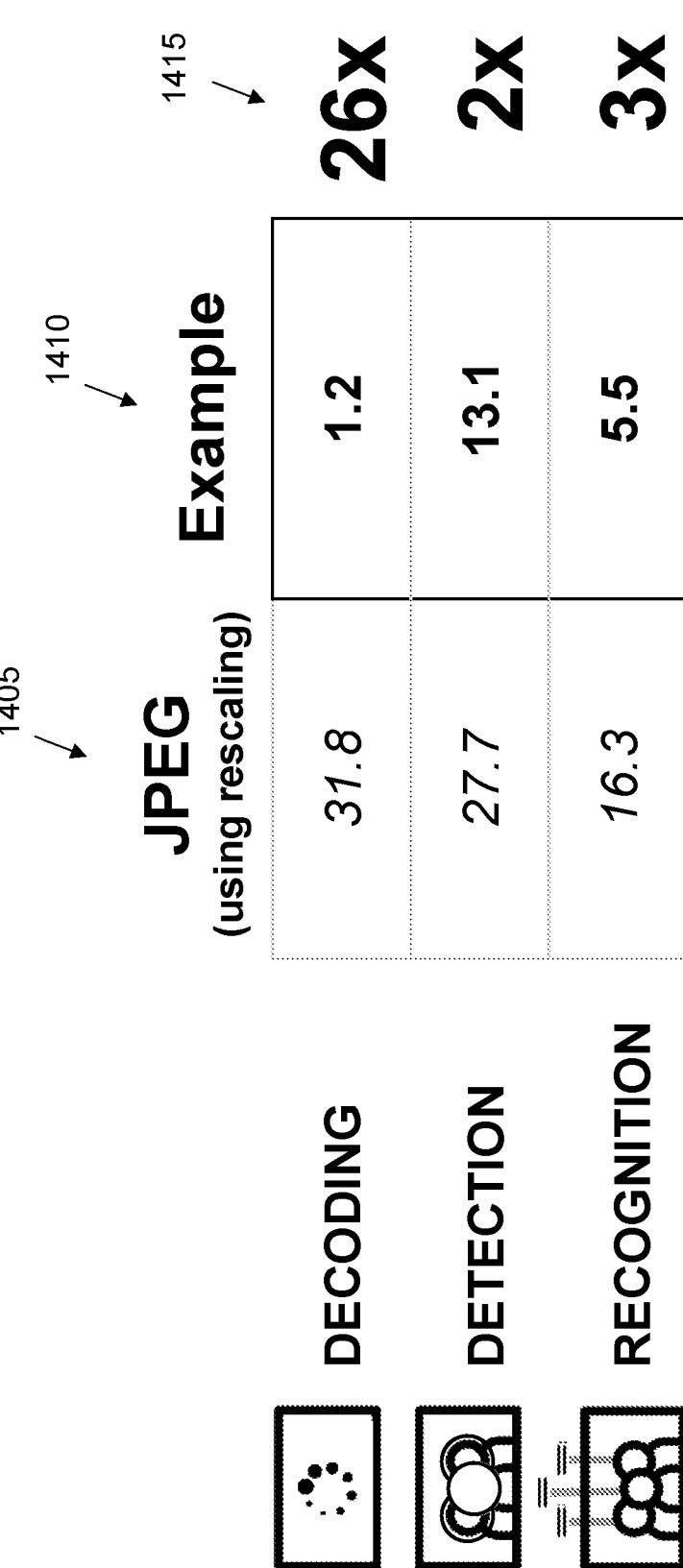
FIG. 14 shows a table indicating improvements compared to comparative operations.

The present examples allow for much quicker remote processing. This can enable real-time inference by advanced neural network architectures. FIG. 14 shows a comparison of various processing operations applied to JPEG images in a comparative approach (1405) and to reconstructions generated using the multi-layer coding described herein (1410). There are three processing operations: decoding, detection and recognition. Decoding may comprise decoding an encoded stream to obtain access to pixel data within reconstructions. Detection may comprise face detection and recognition may comprise face recognition. The figures indicate time (in milliseconds) for the various activities per HD frame. As can be seen, there is a significant decrease in decoding time (a 26× reduction). Detection and recognition times are also reduced by a factor or 2-3 times. The comparisons are based on video feeds for common television channels. An increase of accuracy of 4% was also recorded (e.g. an increase of 0.02 of F1 score, which is a combination of precision and recall metrics).

The reasons for the improvements are various. First, multi-layer coding schemes such as VC-6 allow very efficient and rapid decoding (e.g. as discussed with reference to the example of FIG. 5 above). This means that encoded data may be very rapidly decoded by remote processing devices and access obtained to different tiers of reconstructions. The speed up in detection and recognition may be achieved by only using lower level tiers where necessary. This may allow detection and recognition algorithms to operate more robustly on low resolution frames that are also absent from high frequency detail, which may be "noise" from the viewpoint of a neural network architecture. There is also the benefit that such processing is more immune to adversarial attacks that manipulate high resolution pixel content.

In more detail, a comparative video feed may comprise a full resolution UHDp60 video feed or the like. When this video feed is encoded using comparative video codecs, reconstructed frames are generated at the full resolution and need to be downscaled to a resolution appropriate for video analysis functions. This takes additional time, whereas with multi-layer coding approaches, such as VC-6, lower echelons of data (i.e. lower layers) are directly accessible due to the nature of the encoding. Comparative approaches may also suffer when detection and recognition are performed by video analysis functions that operate on different resolution inputs, as resolution conversion needs to be applied to decoded frames of video or image data, whereas with the multi-layer approach, different resolutions are accessible. Furthermore, the use of tiers of upscaling within the decoding process easily allows upscaling to user-defined resolutions and super-resolution upscaling (e.g. using predictive upscalers). Hence, it is easy to support different modular video analysis functions.

In certain examples, detection and/or recognition may be performed at a highest common factor resolution. With multi-layer approaches such as VC-6, the closest echelon to this common factor resolution may be selected. In certain cases, recognition, such as object or face recognition, is performed on regions of interest that are output by the detection phase of the video analysis. For example, a face or object detection function may output parameters defining a bounding box, which may be used to identify a region of interest. This region of interest may be analysed by subsequent object or face recognition functions (e.g., an object or face within the bounding box may be recognised). In the present examples, only the region of interest from a lower layer reconstruction may need to be upsampled (e.g. as per FIG. 5) and residual data need only be received and decoded that covers the upsampled region of interest. This may speed up processing as comparatively a full image reconstruction may be required, which is typically obtained by reconstructing the full frame at the highest quality and downsampling the full frame to the required resolution for recognition. Moreover, the use of a multi-layer approach such as VC-6 allows further echelons of data for the region of interest to be requested and transmitted to add additional detail and resolution where desired (e.g., if recognition accuracy is below a threshold). Hence, with the present approaches detection may be performed on a lower resolution layer but recognition may be performed on higher resolution data reconstructed using one or more higher layers. These benefits may be further enhanced by performing one or more video analysis functions (such as the detection and recognition discussed here) on one component, such as a Y or luma plane of data. Again, if accuracy is low on the Y or luma plane data, data for further colour components (such as U or V) may be requested and modularly transmitted and received.

EXAMPLE ASPECTS

According to one aspect of an invention described herein, there is provided a method of using a system to classify one or more elements within an input signal. This method comprises a first step of receiving an input signal in a first location, and compressing it with a tier-based hierarchical coding method (such as, by way of non-limiting examples, the coding standards SMPTE VC-6 ST-2117 or MPEG-5 Part 2 LCEVC ISO/IEC 23094-2). The tier or layer-based coding method comprises generating at least two sets of compressed data in a hierarchy enabling, when decoded, reconstruction of the signal up to a respective level of quality. In the method, a first set of compressed data corresponding to the input signal is transmitted to an analysis system in a second location. The analysis system decodes the compressed version of the signal up to a first level of quality by decoding a first set of compressed data to generate a first reconstructed signal and performs a first classification operation on the first reconstructed signal. Based at least in part on said first classification operation, relevant areas of the signal may be identified. These may comprise, e.g., by way of non-limiting example, frames and regions of interest within said frames. These relevant areas may indicate where to perform a second classification operation. In response to this, the analysis system performs a partial file recall operation from the system in the first location. This may comprise a request for additional compressed data, e.g. an additional tier or layer of data. The system in the first location may then transmit to the analysis system in the second location a second set of compressed data corresponding to said relevant areas of the signal. The analysis system in the second location may then decode the compressed version of the signal up to a second level of quality by decoding said second set of compressed data to generate a second reconstructed signal. It may then perform one or more second classification operations on the second reconstructed signal. In the aspects described herein, the terms classification may be seen as one example of more general signal analysis and the terms "compressed" and "encoded" are used interchangeably, wherein a signal may be encoded by using quantisation and/or entropy encoding that compresses the signal.

According to a second aspect, a method of analysing a plurality of video camera feeds comprises:

encoding, at a first location, the plurality of video camera feeds using a layer-based encoding, including generating encoded data streams for each of a plurality of layers within the layer-based encoding, wherein different layers in the plurality of layers correspond to different spatial resolutions, higher layers representing higher spatial resolutions;

transmitting, to a second location remote from the first location, encoded data streams for one or more lowest layers for the plurality of video camera feeds;

decoding, at the second location, the encoded data streams to generate a set of reconstructions of the plurality of video camera feeds at a first spatial resolution;

applying one or more video analysis functions to the set of reconstructions to identify one or more video camera feeds for further analysis;

sending, to the first location for the identified one or more video camera feeds for further analysis, a request for further encoded data streams for one or more layers above the one or more lowest layers;

responsive to the request, transmitting, to the second location, the further encoded data streams for one or more layers above the one or more lowest layers; decoding, at the second location, the further encoded data streams to generate a set of reconstructions for the identified one or more video camera feeds at a second spatial resolution; and applying one or more video analysis functions to the set of reconstructions at the second spatial resolution.

According to a third aspect, a method of remote signal analysis comprises:

receiving, at a computing device over at least one network, encoded data for a plurality of encoded signal streams corresponding to a plurality of input signals, wherein the encoding of the plurality of input signals is performed at an encoding location remote from the computing device, wherein the encoded signal streams are encoded using a layer-based encoding, wherein different layers in the layer-based encoding correspond to different levels of quality, higher layers representing higher levels of quality, and wherein the received encoded data comprises encoded data associated with one or more lowest layers within the layer-based encoding;

decoding the received encoded data to obtain a plurality of reconstructions of the plurality of input signals at the one or more lowest layers;

processing at least one of reconstructions of the plurality of input signals to determine portions of the encoded signal streams for further processing; and requesting, from the encoding location, encoded data for one or more layers above the one or more lowest layers that are associated with the determined portions of the encoded signal streams.

This method may be applied by one or more of the cloud data centre 920 of FIG. 9, the remote server 1060 of FIG. 10 or the distribution centre 1120 of FIG. 1120, amongst other implementations.

According to a fourth aspect, an encoding method, e.g. to be performed at a first location, comprises:

generating, at a first location, encoded data for a plurality of encoded signal streams corresponding to a plurality of input signals, wherein the encoded signal streams are encoded using a layer-based encoding, wherein different layers in the layer-10 based encoding correspond to different levels of quality, higher layers representing higher levels of quality, and wherein the received encoded data comprises encoded data associated with one or more lowest layers within the layer-based encoding;

transmitting the encoded data to a second location remote from the first location for decoding;

receiving a request for further encoded data for one or more layers above the one or more lowest layers, the request relating to one or more of the plurality of input signals; and transmitting the further encoded data to the second location.

This method may be applied by, for example, the encoding platform 940 of FIGS. 9 and 10 or the edge chassis of FIG. 11.

Optionally, in one or more of the above methods, when detecting in the system in the first location that the available bandwidth for data transmission to system in the second location is not sufficient to transmit all of the first set of compression data, the method comprises transmitting a subset of the first set of compression data, wherein the system in the second location reconstructs the signal at the first level of quality based on the received subset of the first set of compression data. In a non-limiting embodiment, the resolution and colour planes of the rendition of the signal at the first level of quality produced when the system receives a subset of the first set of compressed data are the same as those of the rendition produced when the system receives the full first set of compressed data.

Optionally, in one or more of the above methods, based at least in part on an output of the video analysis tasks in the system in the second location, the method comprises signalling to the system in the first location to transmit compressed data for the signal corresponding to reconstruction at a third level of quality, the third level of quality being higher than the first level of quality.

Optionally, in one or more of the above methods, based at least in part on an output of the video analysis tasks in the system in the second location, the method comprises signalling to the system in the first location to transmit compressed data for the signal corresponding to reconstruction at a fourth level of quality, the fourth level of quality being lower than the first level of quality.

Optionally, in one or more of the above methods, the system in the second location performs analysis and/or classification according to methods described herein for multiple signals available in the first location, and identifies one or more signals to transmit at a third level of quality, the third level of quality being higher than the first level of quality, and one or more signals to transmit at a fourth level of quality, the fourth level of quality being lower than the first level of quality. This is of advantage in that the analysis system can control in real time which signals (judged of higher relevance at any one time based on an output of the classification) to transmit to the second location at higher fidelity and which (judged of lower relevance at any one time based on an output of the classification) to transmit at proxy quality, thus optimizing the usage of the available network capacity.

Optionally, in one or more of the above methods, when extra network capacity is available, the method comprises transferring to the second location sets of compressed data pertaining to the signal that had not been already transferred for the purposes of the video analysis tasks. This is of advantage for archival purposes and/or future classification tasks, which will be able to benefit from all of the compressed data being available on site.

Optionally, in one or more of the above methods, steps of decoding and performing signal analysis are performed using a same processing unit and local memory (e.g., by way of non-limiting example, a set of one or more Graphics Processing Units), for example a processing unit and set of memory at a remote processing location.

Optionally, in one or more of the above methods, the video analysis tasks comprise classifications and the first classification, one or more second classifications and one or more third classifications are organized in a hierarchical manner (e.g., by way of non-limiting example, leveraging Bayesian conditional-probability analysis methods), so that the first classification is a coarse classification of some elements in the input signal, and either the one or more second classifications or the one or more third classifications further refine the coarse classification of elements of the elements in the input signal. More optionally, the method may further comprise, based on the coarse classification, selecting, retrieving and decoding only those portions of the second set of compressed data which are determined to require a further classification, and generating the second reconstructed signal based on those decoded portions.

Optionally, in one or more of the above methods, one or more classifications are performed using one or more neural network detectors (for example, a plurality of neural network detectors). Optionally, the neural detectors include a data normalization stage and a subsequent data comparison stage. Optionally, the neural network detectors are implemented in digital hardware (for example, a field programmable gate array (FPGA), computing hardware configured to execute a software product to implement neural network functionality), or a combination of both.

According to a fifth aspect, there is provided a method of (namely a method for) classifying one or more elements within an input signal, the method comprising:

performing a first classification sub-task of a classification task on a first version of the input signal;

based at least in part on an output of the first classification sub-task, identifying and recalling from the first location a second set of compressed data;

reconstructing, based at least in part on said second set of compressed data, a second version of the input signal;

performing one or more second classification sub-tasks of the classification task on a second version of the input signal, wherein the first and second versions of the signal are incrementally fetched from a remote location.

Optionally, the above method further comprises performing one or more third classification sub-tasks of the classification task on a third version of the input signal, said third version generated based on a third set of compressed data recalled from the first location, said third set of compressed data identified based on an output of the one or more second classification sub-tasks. Optionally, in the above method, based on the output of the first classification sub-task, the second version comprises only a portion of the input signal.

Optionally, in one or more of the above methods, a retrieved second set of compressed data comprises data is only data for a subset of the colour planes which form the input signal. In another example, the second version of the signal still comprises all of the colour planes which form the first version of the signal.

Optionally, in one or more of the above methods, reference to different levels of quality correspond to different spatial resolutions, higher layers representing higher spatial resolutions.

Optionally, in one or more of the above methods, the layer-based encoding comprises a base layer at a lowest spatial resolution and a plurality of residual layers above the base layer at higher spatial resolutions, a given residual layer in the plurality of residual layers being determined based on a comparison of data derived from an input signal at a resolution for the layer and data derived from a lower layer.

Optionally, in one or more of the above methods, there are the further steps of determining a region of interest in at least one of reconstructions of the plurality of input signals at the one or more lowest layers and requesting further encoded data relating to the region of interest. This may comprise generating a set of reconstructions for the region of interest at one or more layers above the one or more lowest layers using the further encoded data. In one case, this may comprise determining differential encoded data required to generate a reconstruction at a highest level of quality, the differential encoded data excluding the received encoded data and the received further encoded data and requesting the differential encoded data from the first location.

Optionally, in one or more of the above methods, the method comprises performing object detection within at least one of reconstructions of the plurality of input signals at the one or more lowest layers. In certain cases, the method may comprise performing object detection within at least one of reconstructions of the plurality of input signals at one or more layers above the one or more lowest layers.

Optionally, in one or more of the above methods, the method further comprises identifying one or more sets of frames for one or more of the plurality of input signals for further analysis, and identifying one or more input sources for further analysis, wherein said identifying is performed at one or more of the first, encoding, location and the second, analysis location. In this case, the method may further comprise transmitting encoded data for layers above the one or more lowest layers for the identified frames or the identified input sources.

Optionally, in one or more of the above methods, the method further comprises transmitting encoded data to a remote server for signal analysis and transmitting encoded data to a plurality of users. Transmitting encoded data to a plurality of users may comprise transmitting encoded data to a distribution centre for distribution to the plurality of users. This may comprise analysing a set of reconstructions at the remote server to determine a set of layers of encoded data for one or more input sources to be transmitted to the distribution centre.

Optionally, in one or more of the above methods, the plurality of input signals or the plurality of video input feeds are associated with a plurality of video cameras to capture a live event, wherein the remote server determines which of the plurality of video cameras to select for transmission to the plurality of users, and the levels of quality for the encoded data to transmit to the plurality of users for the selected video cameras.

Optionally, in one or more of the above methods, each level of quality has a different encoding bit rate.

Optionally, in one or more of the above methods, the encoded data transmitted from the first, encoding location, comprises encoded data for a subset of encoded signal components. These may comprise different colour components of the video signal and the subset of encoded components may comprise at least a lightness or luma component.

Optionally, in one or more of the above methods, the method further comprises receiving at the second, remote, location, encoded data for one or more layers above the one or more lowest layers for archiving.

Optionally, in one or more of the above methods, the method further comprise decoding the received encoded data to obtain a plurality of reconstructions of the plurality of input signals at the one or more lowest layers, upscaling the plurality of reconstructions, and performing analysis on the upscaled reconstructions. For example, the upsamplers 526, 522, and 530 in FIG. 5 may comprise neural network upsamplers that act to predict a content of the upsampled reconstructions 520, 528 and 531. In certain cases, the upsampled reconstructions 517, 524 and/or 532 may provide for improved video analysis even without the additional residual data (518, 526, etc) for each layer. In this case, the arrangement of FIG. 5, representing the decoding of a multilayer signal may be advantageous to accommodate different modular video analysis functions (e.g. neural network architectures for classification) that have a fixed input resolution for inference. This may be advantageous when there is network congestion or bandwidth is otherwise limited, i.e. the upscaling is performed responsive to encoded data for one or more layers at the higher resolution and above being unavailable. In these cases video analysis functions may still be applied at a fixed level of quality; when bandwidth is available the residual data for one or more layers may again be encoded, received and decoded and thus lead to improved output for the video analysis functions. In these cases, upscaling optionally uses a neural network architecture trained on a training set comprise versions on an image at two spatial resolutions, so as to learn parameters values to map a reconstruction at a lower resolution to a reconstruction at a higher resolution.

Optionally, in one or more of the above methods, the multi-layer encoding comprises an encoding based on SMPTE VC-6 2117.

Optionally, in one or more of the above methods, the multi-layer encoding comprises an encoding based on ISO/IEC MPEG-5 Part 2 LCEVC.

The appropriate methods set out above may be implemented by an encoding system at a first location. Other ones of the methods may be implemented by a remote analysis system at a second location.

Embodiments of the present disclosure substantially eliminate or at least partially address the aforementioned problems in the prior art, and enable distributed deep learning classification systems to perform accurate and efficient analysis of signals that are available at full resolution and quality in a different location, without said classification requiring to transmit all of those signals to the location of the classification systems.

Certain examples described herein allow very efficiently encoding of a set of signal sources, e.g. a plurality of all cameras at full quality near lossless UHDp60 at an event site. Using these examples, it is possible to transmit, to a remote site in real time only the bytes corresponding to quality up to a given LOQ. In a VC-6 example, this may be LOQ-4 (minus 4), and possibly only one colour component such as luma may be transmitted. At the remote site, such as at a remote processing device and/or processing device at a cloud data centre or distribution centre, efficient detection passes may be performed on these lower level "proxy videos" (i.e. reconstructions from the lower level video) and frames and regions of interest may be identified based on automated analysis algorithms. Any identified portions of interest may be used to fetch, from the event site, a set of residual or differential bytes that are necessary to have a higher quality and/or resolution reconstruction to allow further video analysis to be performed for portions of reconstructions at a high level of quality (e.g. up to the original full quality or full resolution signal feed).

Certain examples described here may have applications for remote/at-home production applications, media archive analysis and/or distribution, industrial applications, security/surveillance applications, and/or Internet of Things applications, amongst others. The examples avoid a false choice between needing to perform advanced video analysis "on-site" or to perform it in the cloud on a very poor-quality feed. Instead, the present examples provide a mechanism of partial file recall that allows analysis to be incrementally performed "from remote", in a possibly real-time interactive manner, that may be easily incorporated into parallelised AI processing pipelines.

Example Apparatus for Implementing the Edge or Remote Processing Devices

Referring to FIG. 12, there is shown a schematic block diagram of an example of an apparatus 1200. The apparatus 1200 may be used to implement one or more of an edge computing device that performs an encoding operation as described herein and a remote computing device that performs remote signal analysis as described herein. In one case, there may be a plurality of the apparatus 1200 at one or more of the edge and remote (i.e. "cloud") locations.

Examples of the apparatus 1200 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, a vehicle etc., or in general any type of computing or electronic device. In a preferred example, the apparatus comprises a server computing device.

In this example, the apparatus 1200 comprises one or more processors 1201 configured to process information and/or instructions. The one or more processors 1201 may comprise a central processing unit (CPU). The one or more processors 1201 are coupled with a bus 1202. Operations performed by the one or more processors 1201 may be carried out by hardware and/or software. The one or more processors 1201 may comprise multiple co-located processors or multiple disparately located processors.

In this example, the apparatus 1200 comprises computer-useable volatile memory 1203 configured to store information and/or instructions for the one or more processors 1201. The computer-useable volatile memory 1203 is coupled with the bus 1202. The computer-useable volatile memory 1203 may comprise random access memory (RAM).

In this example, the apparatus 1200 comprises computer-useable non-volatile memory 1204 configured to store information and/or instructions for the one or more processors 501. The computer-useable non-volatile memory 1204 is coupled with the bus 1202. The computer-useable non-volatile memory 1204 may comprise read-only memory (ROM).

In this example, the apparatus 1200 comprises one or more data-storage units 1205 configured to store information and/or instructions. The one or more data-storage units 1205 are coupled with the bus 1202. The one or more data-storage units 1205 may for example comprise a magnetic or optical disk and disk drive or a solid-state drive (SSD).

In this example, the apparatus 1200 comprises one or more input/output (I/O) devices 1206 configured to communicate information to and/or from the one or more processors 1201. The one or more I/O devices 506 are coupled with the bus 1202. The one or more I/O devices 506 comprise at least one network interface. The at least one network interface enables the apparatus 1200 to communicate via one or more data communications networks. Examples of data communications networks include, but are not limited to, a Wide Area Network (WAN such as the Internet) and a Local Area Network (LAN). Many data communications links may comprise communications over a plurality of interconnected networks as is known in the art. The one or more I/O devices 1206 may enable a user to provide input to the apparatus 1200 via one or more input devices (not shown). The one or more I/O devices 1206 may enable information to be provided to a user via one or more output devices (not shown).

Various other entities are depicted for the apparatus 1200. For example, when present, an operating system 1207, data processing module 1208, one or more further modules 1209, and data 1210 are shown as residing in one, or a combination, of the computer-usable volatile memory 1203, computer-usable non-volatile memory 1204 and the one or more data-storage units 1205. The signal processing module 1208 may be implemented by way of computer program code stored in memory locations within the computer-usable non-volatile memory 1204, computer-readable storage media within the one or more data-storage units 1205 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 1200 may therefore comprise a data processing module 1208 which can be executed by the one or more processors 1201. The data processing module 1208 can be configured to include instructions to implement at least some of the operations described herein. During operation, the one or more processors 1201 launch, run, execute, interpret or otherwise perform the instructions in the data processing module 1208.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 1200 may comprise more, fewer and/or different components from those depicted in FIG. 12. At each of the edge and cloud locations, the apparatus 1200 may be implemented as a single entity or as a distributed computing platform. For example, a remote processing device may comprise a plurality of processing devices that are interconnected with high-speed data communications links (e.g. as compared to a more limited link between the edge and the remote processing device). Similarly, processing at an edge location may be performed by a plurality of interconnected devices (e.g. coupled via a LAN).

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged. Different combinations of described options and features, including omission of certain features, are explicitly allowed and may be provided in different implementations. For example, it is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of analysing a plurality of video camera feeds, the method comprising:

encoding, at a first location, the plurality of video camera feeds using a layer-based encoding, including generating encoded data streams for each of a plurality of layers within the layer-based encoding, wherein different layers in the plurality of layers correspond to different levels of quality, higher layers representing higher levels of quality;

transmitting, to a second location remote from the first location, encoded data streams for one or more lowest layers for the plurality of video camera feeds;

decoding, at the second location, the encoded data streams to generate a set of reconstructions of the plurality of video camera feeds at a first level of quality;

applying one or more video analysis functions to the set of reconstructions to identify one or more video camera feeds for further analysis;

sending, to the first location for the identified one or more video camera feeds for further analysis, a request for further encoded data streams for one or more layers above the one or more lowest layers;

responsive to the request, transmitting, to the second location, the further encoded data streams for one or more layers above the one or more lowest layers;

decoding, at the second location, the further encoded data streams to generate a set of reconstructions for the identified one or more video camera feeds at a second level of quality; and applying one or more video analysis functions to the set of reconstructions at the second level of quality, wherein the layer-based encoding comprises a base layer at a lowest level of quality and one or more residual layers above the base layer at higher levels of quality, a given residual layer in the one or more residual layers being determined based on a comparison of data derived from an input signal at a level of quality for the layer and data derived from a lower layer, and wherein the one or more residual layers are generated without inter-block dependencies such that each coding unit within each residual layer can be decoded independently of other coding units within the same residual layer, and wherein each residual layer is decoded independently of other residual layers and the base layer.

2. The method of claim 1, further comprising:

determining a region of interest in at least one of reconstructions of the plurality of input signals at the one or more lowest layers; and requesting further encoded data relating to the region of interest.

3. The method of claim 2, further comprising:

generating a set of reconstructions for the region of interest at one or more layers above the one or more lowest layers using the further encoded data.

4. The method of claim 2, further comprising:

determining differential encoded data required to generate a reconstruction at a highest level of quality, the differential encoded data excluding the received encoded data and the received further encoded data; and requesting the differential encoded data from the first location.

5. The method of claim 1, further comprising:

performing object detection within at least one of reconstructions of the plurality of input signals at the one or more lowest layers.

6. The method of claim 1, further comprising:

performing object detection within at least one of reconstructions of the plurality of input signals at one or more layers above the one or more lowest layers.

7. The method of claim 1, the method comprising one or more of:

identifying one or more sets of frames for one or more of the plurality of input signals for further analysis, and identifying one or more input sources for further analysis;

wherein said identifying is performed at one or more of the first, encoding, location and the second, analysis location.

8. The method of claim 7, further comprising:

transmitting encoded data for layers above the one or more lowest layers for the identified frames or the identified input sources.

9. The method of claim 1, further comprising:

transmitting encoded data to a remote server for signal analysis; and transmitting encoded data to a plurality of users.

10. The method of claim 9, wherein transmitting encoded data to a plurality of users comprises transmitting encoded data to a distribution centre for distribution to the plurality of users.

11. The method of claim 10, further comprising:

analysing a set of reconstructions at the remote server to determine a set of layers of encoded data for one or more input sources to be transmitted to the distribution centre, wherein the plurality of input signals or the plurality of video input feeds are associated with a plurality of video cameras to capture a live event, wherein the remote server determines which of the plurality of video cameras to select for transmission to the plurality of users, and the levels of quality for the encoded data to transmit to the plurality of users for the selected video cameras.

12. The method of claim 1, wherein the encoded data transmitted from the first, encoding, location, comprises encoded data for a subset of encoded signal components, wherein the encoded signal components comprise different colour components of the video signal and the subset of encoded components comprise at least a lightness or luma component.

13. The method of claim 1, further comprising:

receiving at the second, remote, location, encoded data for one or more layers above the one or more lowest layers for archiving.

14. The method of claim 1, further comprising:

decoding the received encoded data to obtain a plurality of reconstructions of the plurality of input signals at the one or more lowest layers;

upscaling the plurality of reconstructions;

performing analysis on the upscaled reconstructions, wherein the upscaling uses a neural network architecture trained on a training set comprise versions on an image at two spatial resolutions, so as to learn parameters values to map a reconstruction at a lower resolution to a reconstruction at a higher resolution, and wherein the upscaling is performed responsive to encoded data for one or more layers at the higher resolution and above being unavailable.

15. The method of claim 1, wherein the multi-layer encoding comprises an encoding based on one or more of SMPTE VC-6 2117 and ISO/IEC MPEG-5 Part 2 LCEVC.

16. A method of remote signal analysis comprising:

receiving, at a computing device over at least one network, encoded data for a plurality of encoded signal streams corresponding to a plurality of input signals, wherein the encoding of the plurality of input signals is performed at an encoding location remote from the computing device, wherein the encoded signal streams are encoded using a layer-based encoding, wherein different layers in the layer-based encoding correspond to different levels of quality, higher layers representing higher levels of quality, and wherein the received encoded data comprises encoded data associated with one or more lowest layers within the layer-based encoding;

decoding the received encoded data to obtain a plurality of reconstructions of the plurality of input signals at the one or more lowest layers;

processing at least one of reconstructions of the plurality of input signals to determine portions of the encoded signal streams for further processing; and requesting, from the encoding location, encoded data for one or more layers above the one or more lowest layers that are associated with the determined portions of the encoded signal streams, wherein the layer-based encoding comprises a base layer at a lowest level of quality and one or more residual layers above the base layer at higher levels of quality, a given residual layer in the one or more residual layers being determined based on a comparison of data derived from an input signal at a level of quality for the layer and data derived from a lower layer, and wherein the one or more residual layers are generated without inter-block dependencies such that each coding unit within each residual layer can be decoded independently of other coding units within the same residual layer, and wherein each residual layer is decoded independently of other residual layers and the base layer.

17. The method of claim 16, wherein different levels of quality correspond to different spatial resolutions, higher layers representing higher spatial resolutions.

18. The method of claim 17, wherein each level of quality has a different encoding bit rate.

19. An encoding method comprising:

generating, at a first location, encoded data for a plurality of encoded signal streams corresponding to a plurality of input signals, wherein the encoded signal streams are encoded using a layer-based encoding, wherein different layers in the layer-based encoding correspond to different levels of quality, higher layers representing higher levels of quality, and wherein the received encoded data comprises encoded data associated with one or more lowest layers within the layer-based encoding;

transmitting the encoded data to a second location remote from the first location for decoding;

receiving a request for further encoded data for one or more layers above the one or more lowest layers, the request relating to one or more of the plurality of input signals; and transmitting the further encoded data to the second location, wherein the layer-based encoding comprises a base layer at a lowest level of quality and one or more residual layers above the base layer at higher levels of quality, a given residual layer in the one or more residual layers being determined based on a comparison of data derived from an input signal at a level of quality for the layer and data derived from a lower layer, and wherein the one or more residual layers are generated without inter-block dependencies such that each coding unit within each residual layer can be decoded independently of other coding units within the same residual layer, and wherein each residual layer is decoded independently of other residual layers and the base layer.

* * * * *